United States Patent
Fulton et al.

(10) Patent No.: US 11,300,486 B1
(45) Date of Patent: Apr. 12, 2022

(54) APPARATUS FOR PRODUCING HIGH YIELD CORES FOR USE IN A MICROARRAY BLOCK, METHOD FOR USING SAME

(71) Applicant: Array Science, LLC, Sausalito, CA (US)

(72) Inventors: Regan Spencer Fulton, Sausalito, CA (US); William Scott Crawford, Dublin, CA (US); Trinh Kiet Hoac, San Francisco, CA (US)

(73) Assignee: Array Science, LLC, Sausalito, CA (US)

( * ) Notice: Subject to any disclaimer, the term of this patent is extended or adjusted under 35 U.S.C. 154(b) by 815 days.

(21) Appl. No.: 15/822,097

(22) Filed: Nov. 24, 2017

Related U.S. Application Data

(60) Provisional application No. 62/426,195, filed on Nov. 23, 2016.

(51) Int. Cl.
*G01N 1/36* (2006.01)

(52) U.S. Cl.
CPC ......... *G01N 1/36* (2013.01); *G01N 2001/368* (2013.01)

(58) Field of Classification Search
None
See application file for complete search history.

(56) References Cited

U.S. PATENT DOCUMENTS

| | | | |
|---|---|---|---|
| 1,847,365 A | 3/1932 | Skinner | |
| 4,910,146 A | 3/1990 | Tur-Kaspa et al. | |
| 4,914,022 A * | 4/1990 | Furmanski | G01N 1/36 435/40.52 |
| 5,002,377 A | 3/1991 | Battifora et al. | |
| 6,103,518 A | 8/2000 | Leighton | |
| 6,350,618 B1 * | 2/2002 | Borrelli | B01J 19/0046 422/507 |
| 6,458,598 B1 * | 10/2002 | Huang | G01N 1/06 427/2.11 |
| 6,596,237 B1 * | 7/2003 | Borrelli | B01J 19/0046 101/327 |
| 6,699,710 B1 | 3/2004 | Kononen et al. | |
| 6,762,061 B1 * | 7/2004 | Borrelli | B01J 19/0046 101/327 |

(Continued)

OTHER PUBLICATIONS

Advisory Action and Response After Final dated Apr. 2, 2014 for U.S. Appl. No. 12/156,700, filed Jun. 4, 2008, pp. 1-6.

(Continued)

*Primary Examiner* — Brian R Gordon
(74) *Attorney, Agent, or Firm* — Intellectual Innovations Legal Advisors

(57) ABSTRACT

A method for making a microarray block with a recipient block having at least one bore therein. A mold having a cylindrical bore with a cross-sectional shape approximating the cross-sectional shape of the at least one bore of the recipient block can be provided. The first end of the mold can have an opening that communicates with a cylindrical bore of the mold. A biological sample and a liquid carrier medium can be introduced through the opening and solidified in the mold to form a core. The core can be removed from the mold and at least a portion of the core can be inserted into the at least one bore of the recipient block. Related methods and assemblies are provided.

17 Claims, 30 Drawing Sheets

(56) References Cited

U.S. PATENT DOCUMENTS

| | | | |
|---|---|---|---|
| 6,884,626 B1* | 4/2005 | Borrelli | G01N 35/1067 422/507 |
| 6,905,644 B1 | 6/2005 | Mueller et al. | |
| 7,029,615 B2 | 4/2006 | Lilischkis et al. | |
| 7,405,056 B2 | 7/2008 | Lam et al. | |
| 8,911,682 B2* | 12/2014 | Fulton | G01N 1/286 422/500 |
| 9,395,283 B1* | 7/2016 | Chan | G01N 1/36 |
| 9,523,629 B2* | 12/2016 | Fulton | G01N 1/286 |
| 2002/0009767 A1 | 1/2002 | Muraca | |
| 2002/0197656 A1* | 12/2002 | Li | C40B 30/04 435/7.21 |
| 2003/0038401 A1* | 2/2003 | Lilischkis | B29C 33/0033 264/248 |
| 2003/0040035 A1* | 2/2003 | Slamon | G01N 1/42 435/40.5 |
| 2003/0157523 A1* | 8/2003 | Frantz | G01N 33/554 506/23 |
| 2003/0215936 A1* | 11/2003 | Kallioniemi | G01N 1/36 435/287.1 |
| 2004/0197897 A1 | 10/2004 | Leighton | |
| 2005/0176088 A1* | 8/2005 | Song | G01N 1/36 435/40.5 |
| 2005/0282246 A1* | 12/2005 | Postoyalko | B01L 3/5085 435/40.52 |
| 2006/0199169 A1 | 9/2006 | Lam et al. | |
| 2006/0216781 A1* | 9/2006 | Gebing | G01N 1/36 435/40.52 |
| 2006/0269985 A1* | 11/2006 | Kitayama | G01N 1/36 435/40.52 |
| 2007/0218542 A1* | 9/2007 | Li | C12M 23/42 435/283.1 |
| 2008/0318805 A1* | 12/2008 | Fulton | G01N 1/286 506/14 |
| 2010/0087333 A1* | 4/2010 | Fukuoka | G01N 1/36 506/13 |
| 2010/0323907 A1 | 12/2010 | Ton-That et al. | |
| 2011/0046017 A1* | 2/2011 | Song | G01N 1/36 506/23 |
| 2011/0218558 A1* | 9/2011 | Fukuoka | G01N 1/36 606/151 |
| 2012/0088233 A1* | 4/2012 | Boonyaratanakornkit | G01N 1/30 435/6.1 |
| 2014/0135236 A1* | 5/2014 | Musat | G01N 1/36 506/18 |
| 2014/0271407 A1* | 9/2014 | Knorr | B01L 3/5457 422/536 |
| 2016/0313224 A1* | 10/2016 | Lau | G01N 1/36 |
| 2017/0097292 A1* | 4/2017 | Fulton | G01N 1/36 |
| 2017/0108414 A1* | 4/2017 | Maclellan | G01N 1/36 |
| 2017/0199104 A1* | 7/2017 | Gradinaru | C12Q 1/68 |

OTHER PUBLICATIONS

Applicant Initiated Interview Summary dated Nov. 25, 2013 for U.S. Appl. No. 12/156,700, filed Jun. 4, 2008, pp. 1-3.

Applicant Initiated Interview Summary dated Mar. 31, 2014 for U.S. Appl. No. 12/156,700, filed Jun. 4, 2008, pp. 1-3.

Battifora H., "The Checkerboard Tissue Block. An Improved Multitissue Control Block," Laboratory Investigation—A Journal of Technical Methods and Pathology, 1990, vol. 63 (5), pp. 722-724.

Battifora H., "The Multitumor (Sausage) Tissue Block: Novel Method for Immunohistochemical Antibody Testing," Laboratory Investigation—A Journal of Technical Methods and Pathology, 1986, vol. 55 (2), pp. 244-248.

Eguiluz C., et al., "Multitissue Array Review: A Chronological Description of Tissue Array Techniques, Applications and Procedures," Pathology, Research and Practice, 2006, vol. 202 (8), pp. 561-568.

Examiner Initiated Interview Summary dated Aug. 12, 2016 for U.S. Appl. No. 14/572,343, filed Dec. 16, 2014, 1 page.

Examiner Initiated Interview Summary dated Mar. 18, 2011 for U.S. Appl. No. 12/156,700, filed Jun. 4, 2008, pp. 1-3.

Fedor H.L., et al., "Practical Methods for Tissue Microarray Construction" Methods in Molecular Medicine, Pancreatic Cancers—Methods and Protocols, 2004, vol. 103, pp. 89-101.

Final Office Action dated Oct. 4, 2010 for U.S. Appl. No. 12/156,700, filed Jun. 4, 2008, pp. 1-18.

Final Office Action dated Jan. 27, 2014 for U.S. Appl. No. 12/156,700, filed Jun. 4, 2008, pp. 1-8.

Kononen J., et al., "Tissue Microarrays for High-throughput Molecular Profiling of Tumor Specimens," Nature Medicine, 1998, vol. 4 (7), pp. 844-847.

Lebaron M.J., et al., "Ultrahigh Density Microarrays of Solid Samples," Nature Methods, 2005, vol. 2 (7), pp. 511-513.

Montgomery K., et al., "A Novel Method for Making "tissue" Microarrays from Small Numbers of Suspension Cells," Applied Immunohistochemistry and Molecular Morphology, 2005, vol. 13 (1), pp. 80-84.

Moskaluk C.A., et al., "Agarose Mold Embedding of Cultured Cells for Tissue Microarrays," Diagnostic Molecular Pathology, 2002, vol. 11 (4), pp. 234-238.

Non-Final Office Action dated Feb. 4, 2010 for U.S. Appl. No. 12/156,700, filed Jun. 4, 2008, pp. 1-15.

Non-Final Office Action dated Oct. 18, 2013 for U.S. Appl. No. 12/156,700, filed Jun. 4, 2008, pp. 1-9.

Notice of Allowance dated Aug. 12, 2016 for U.S. Appl. No. 14/572,343, filed Dec. 16, 2014, pp. 1-10.

Notice of Allowance dated Oct. 27, 2014 for U.S. Appl. No. 12/156,700, filed Jun. 4, 2008, pp. 1-5.

Parsons M., et al., "How to Make Tissue Microarrays," Diagnostic Histopathology, 2009, vol. 15 (3), pp. 142-150.

Non-Final Office Action dated Jul. 12, 2017 for U.S. Appl. No. 15/382,456, filed Dec. 16, 2016, pp. 1-18.

Response dated Jun. 6, 2017 for Restriction Requirement dated Apr. 6, 2017 for U.S. Appl. No. 15/382,456, filed Dec. 16, 2016, pp. 1-5.

Requirement for Restriction/Election dated Apr. 6, 2017 for U.S. Appl. No. 15/382,456, filed Dec. 16, 2016, pp. 1-5.

Requirement for Restriction/Election dated Oct. 21, 2009 for U.S. Appl. No. 12/156,700, filed Jun. 4, 2008, pp. 1-13.

Response dated Dec. 2, 2013 for Non-Final Office Action dated Oct. 18, 2013 for U.S. Appl. No. 12/156,700, filed Jun. 4, 2008, pp. 1-8.

Response dated Mar. 4, 2011 for Final Office Action dated Oct. 4, 2010 for U.S. Appl. No. 12/156,700, filed Jun. 4, 2008, pp. 1-10.

Response dated Jul. 6, 2010 for Non-Final Office Action dated Feb. 4, 2010 for U.S. Appl. No. 12/156,700, filed Jun. 4, 2008, pp. 1-7.

Response dated Jul. 11, 2016 for Restriction Requirement/Election dated May 31, 2016 for U.S. Appl. No. 14/572,343, filed Dec. 16, 2014, pp. 1-8.

Response dated Nov. 13, 2009 for Requirement for Restriction/Election dated Oct. 21, 2009 for U.S. Appl. No. 12/156,700, filed Jun. 4, 2008, pp. 1-2.

Response dated Jul. 25, 2014 for Final Office Action dated Jan. 27, 2014 and Advisory Action dated Apr. 2, 2014 for U.S. Appl. No. 12/156,700, filed Jun. 4, 2008, pp. 1-15.

Response dated Mar. 27, 2014 for Final Office Action dated Jan. 27, 2014 for U.S. Appl. No. 12/156,700, filed Jun. 4, 2008, pp. 1-12.

Restriction Requirement/Election dated May 31, 2016 for U.S. Appl. No. 14/572,343, filed Dec. 16, 2014, pp. 1-5.

Sarewitz S.J., "Anatomic Pathology Checklist," Commission on Laboratory Accreditation—Laboratory Accreditation Program, Web File, Sep. 27, 2007, 1-95.

Theillet C., "Full Speed Ahead for Tumor Screening—A New High-throughput Tissue Microarray Technology is Capable of Simultaneously Testing Hundreds of Tumor Samples for a Number of Different Molecular Markers," Nature Medicine, 1998, vol. 4 (7), pp. 767-768.

* cited by examiner

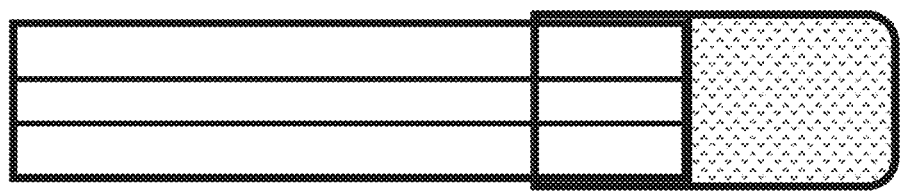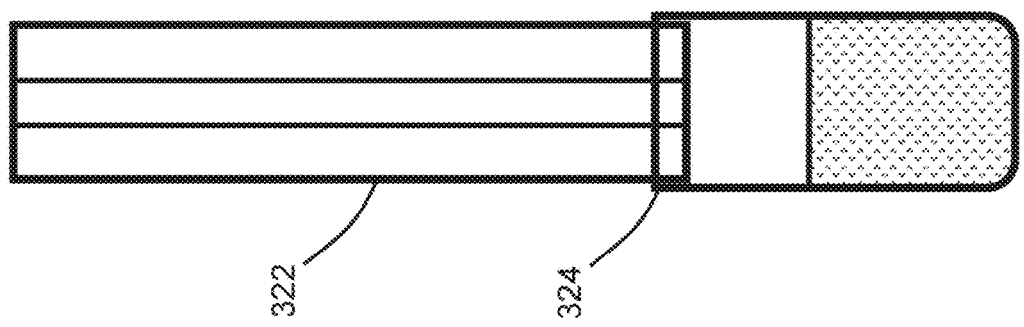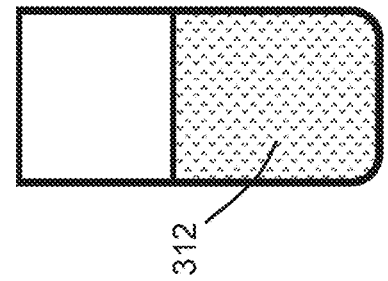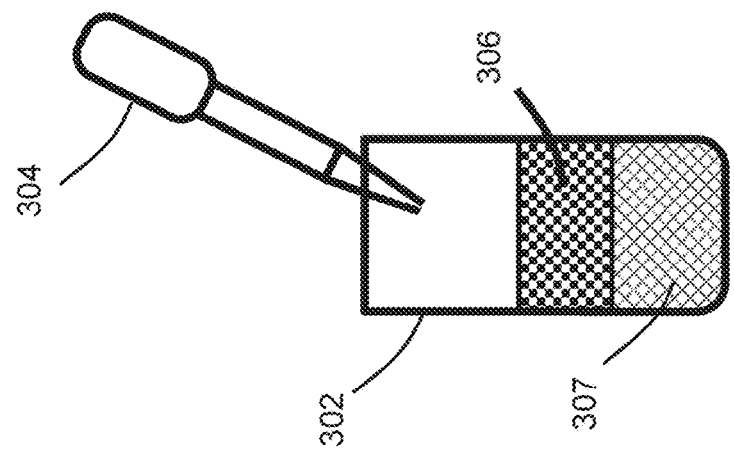

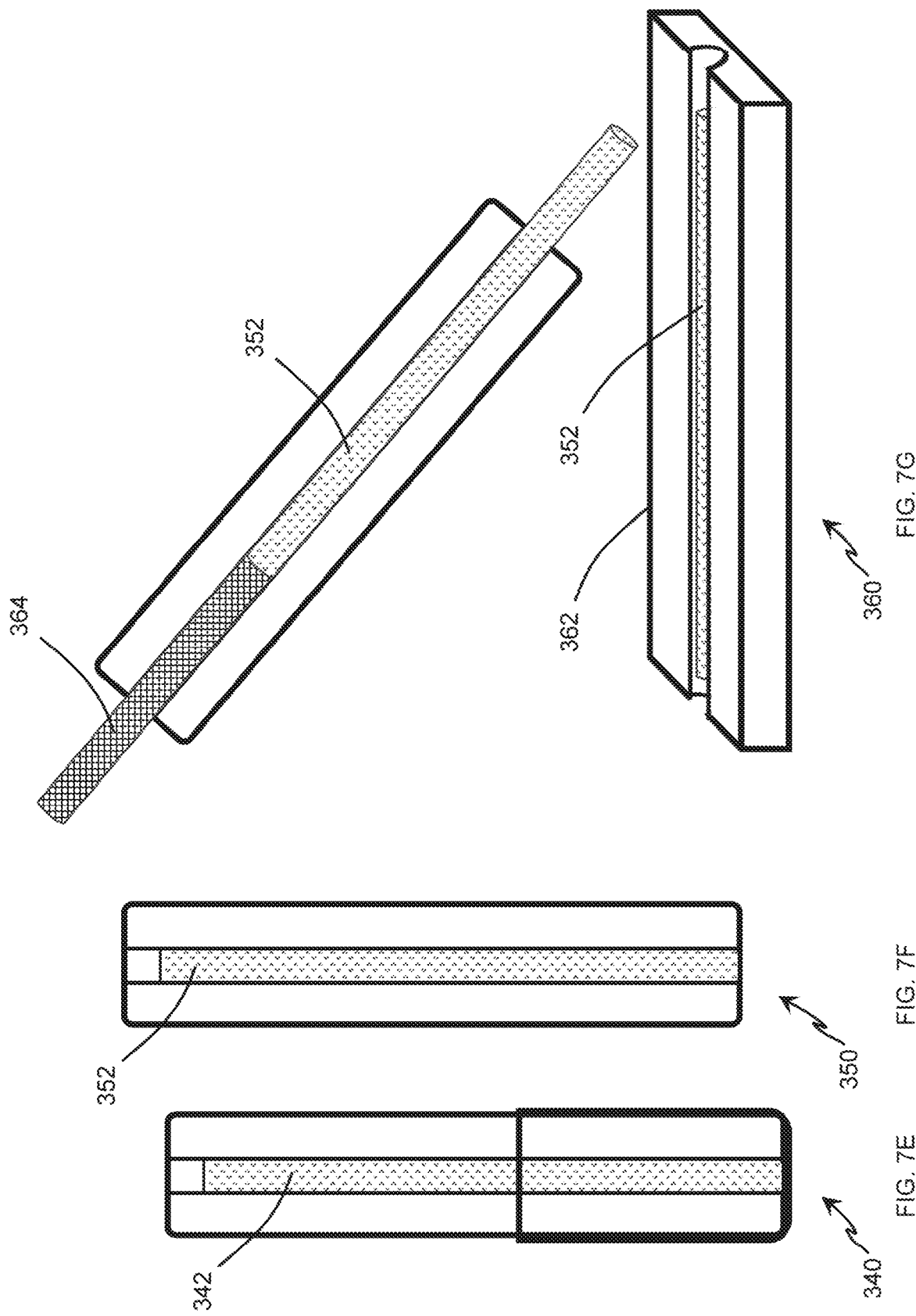

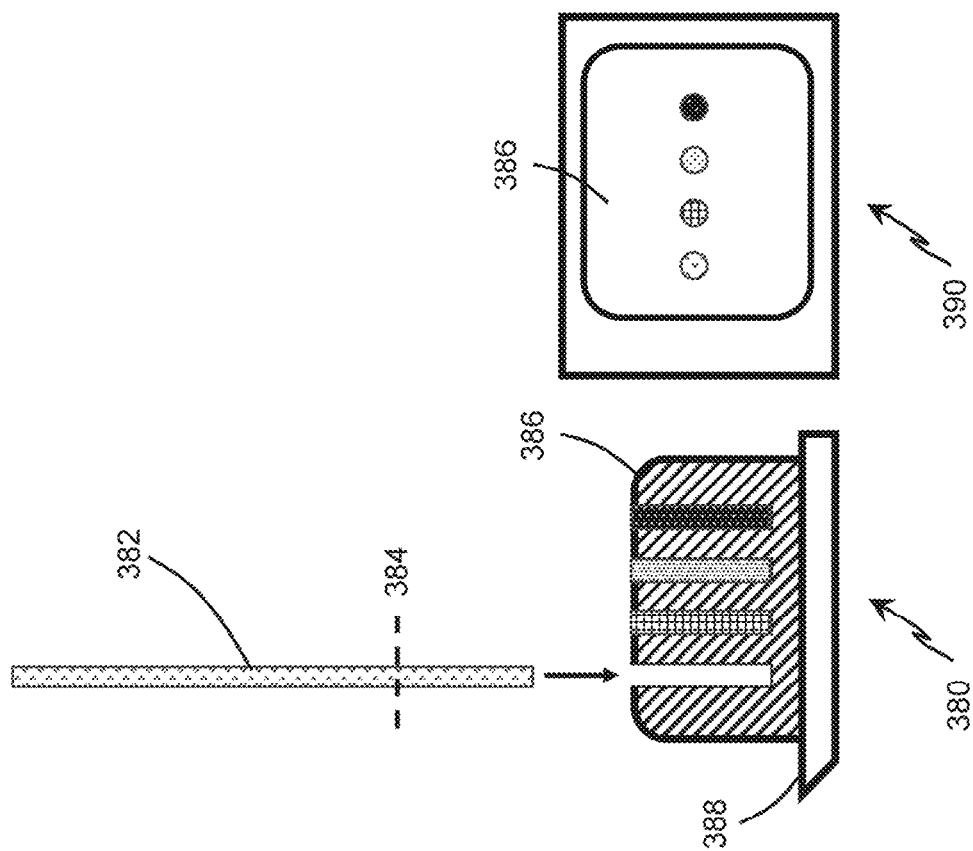
FIG. 7I
FIG. 7J
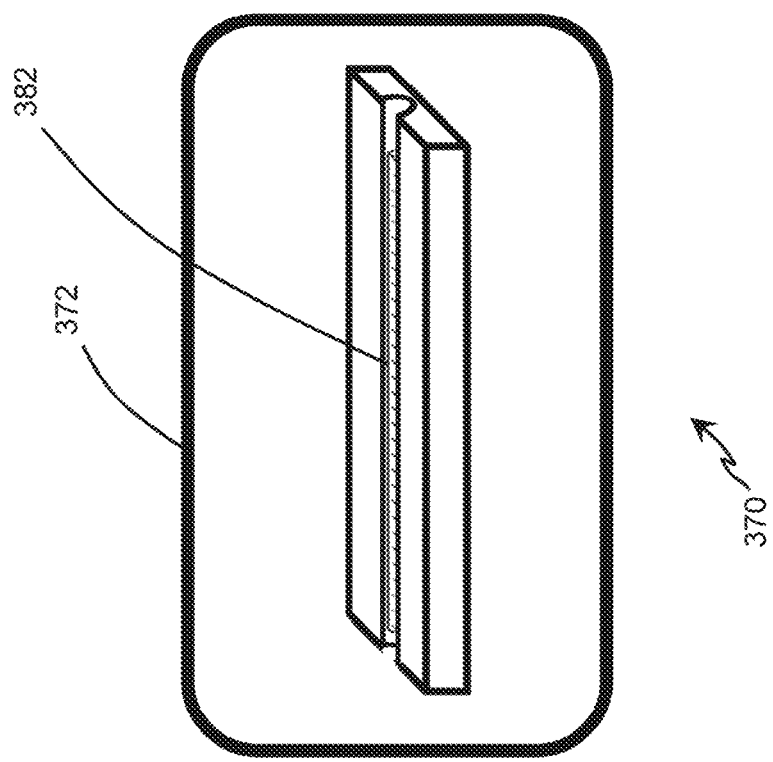
FIG. 7H

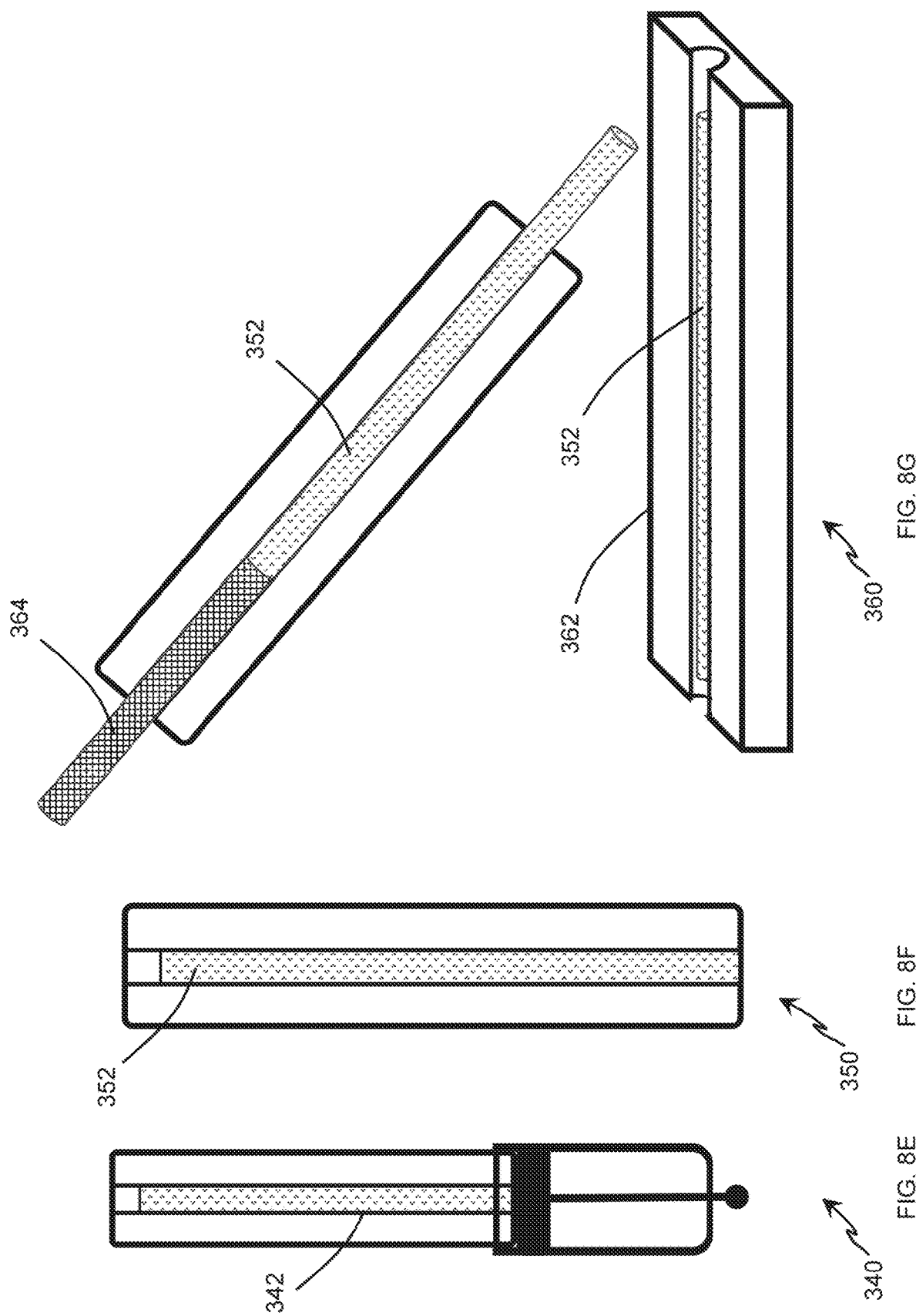

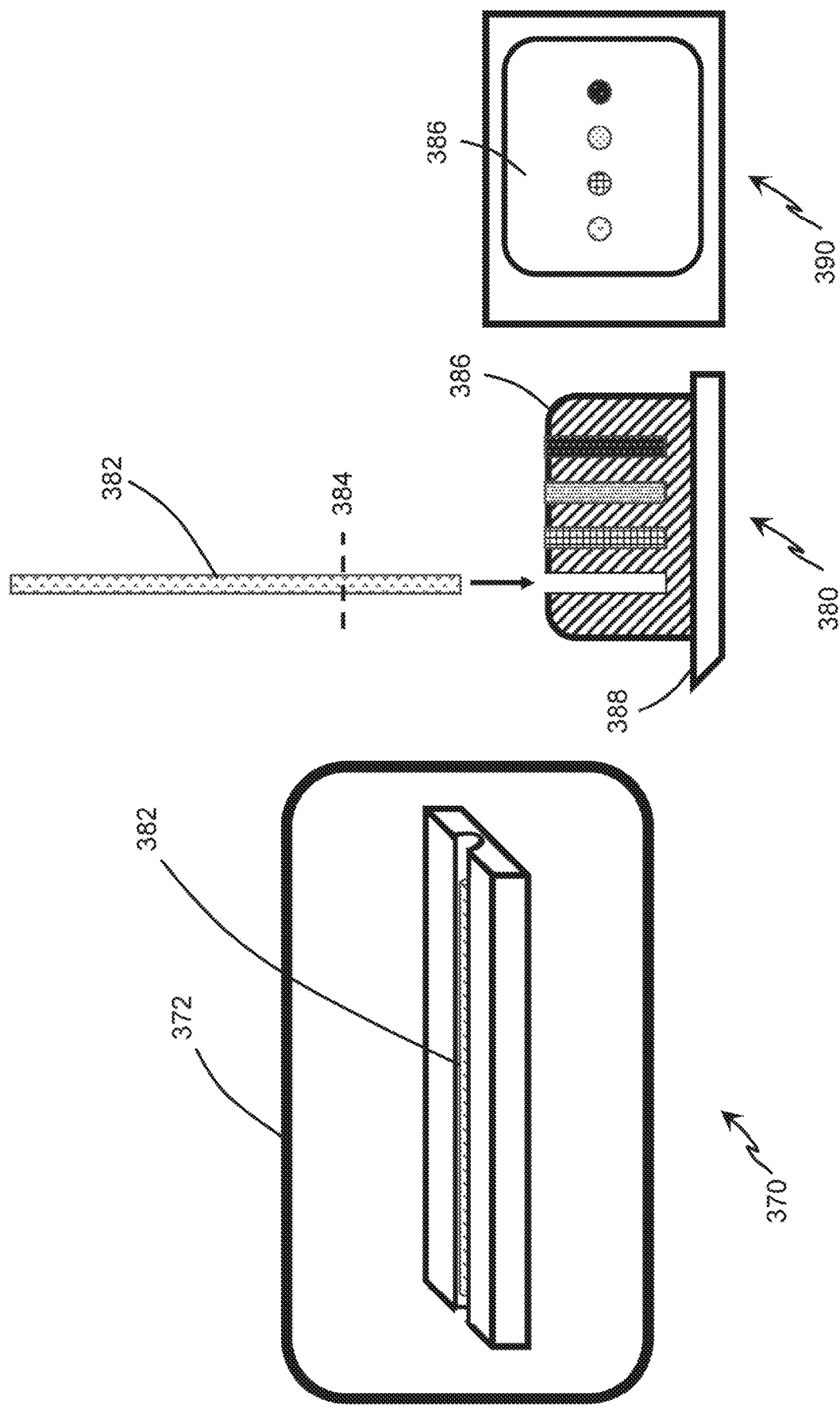

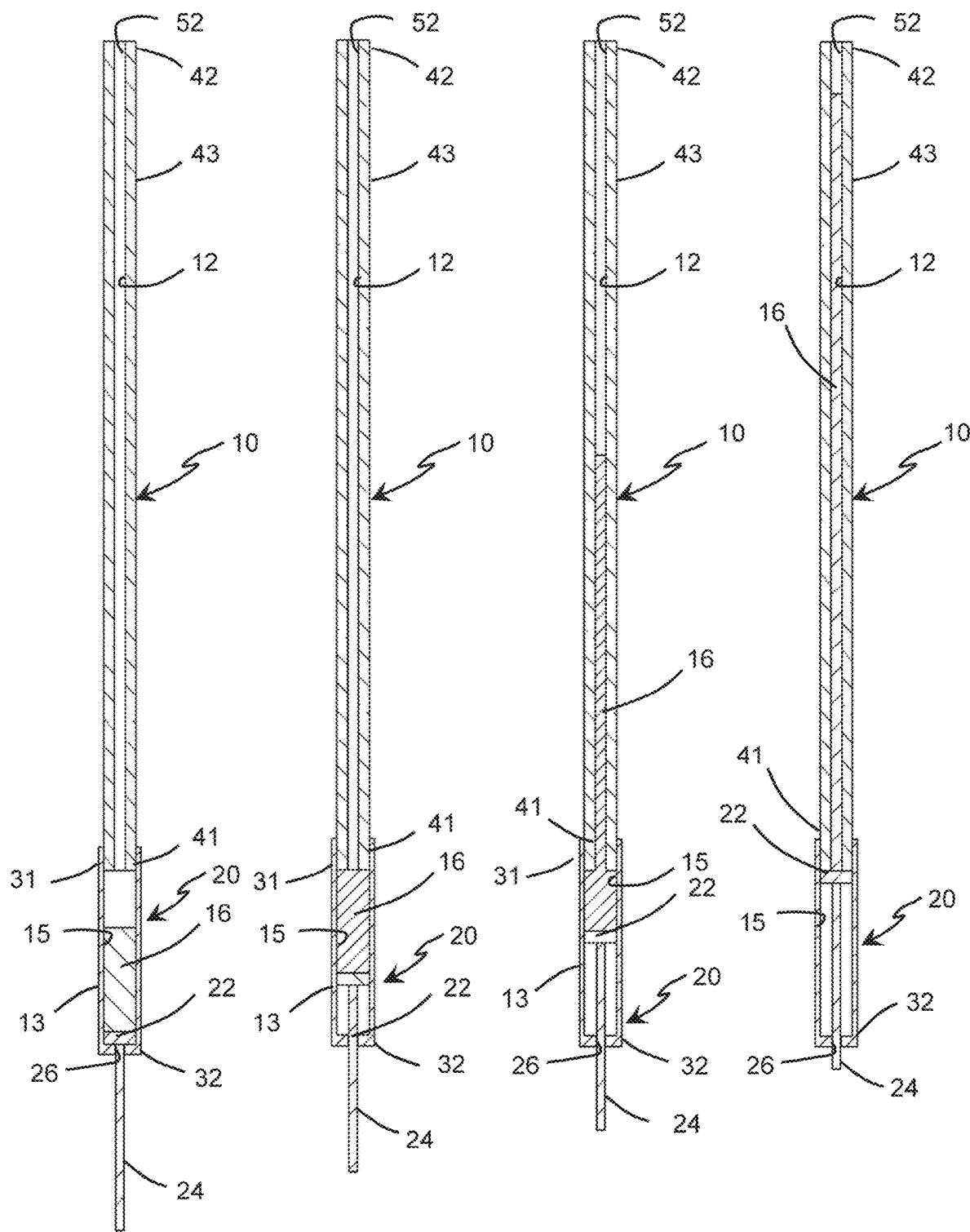

APPARATUS FOR PRODUCING HIGH YIELD CORES FOR USE IN A MICROARRAY BLOCK, METHOD FOR USING SAME

CROSS REFERENCE TO RELATED APPLICATION

This application claims priority to U.S. provisional patent application Ser. No. 62/426,195 filed Nov. 23, 2016, the entire content of which is incorporated herein by this reference.

FIELD OF THE INVENTION

The present invention relates to microarray blocks and, more particularly, to high yield microarray blocks.

BACKGROUND

A current microarray block typically contains a body formed from a material and having one or more "cores" arranged in a predetermined pattern in a body. Current materials for forming the body include paraffin wax, an agarose gel and a polymeric medium. The cores contain material to be analyzed, for example biological or chemical species. The cores may also contain a solid matrix material in which the material to be analyzed is contained.

Prior art methods for the production of cell microarray blocks consist mainly of directly punching a donor block or processing cells in agarose pellets and placing them directly into a recipient block (see FIG. 1). See, for example, Kononen J, Bubendorf L, Kallioniemi A, Barlund M, Schraml P, Leighton S, Torhorst J, Mihatsch M J, Sauter G, Kallioniemi OP. "Tissue microarrays for high-throughput molecular profiling of tumor specimens." Nature Medicine, July 1998, 4(7): 844-847 and U.S. Pat. No. 6,103,518. An instrument that embodies such technique is commonly used to produce such cell microarray blocks. See, for example, Montgomery K, Zhao S, van de Rijn M, and Natkunam Y. "A Novel Method for Making 'Tissue' Microarrays from Small Numbers of Suspension Cells." Appl Immunohistochem Mol Morphol, March 2005; 13(1): 80-84 and Waterworth A, Hanby A, Speirs V. "A novel cell array technique for high-throughput, cell-based analysis." In Vitro Cell Dev Biol Anim, 2005, 41: 185-187. Material to be analyzed that is located in the interstitial spaces between punches is commonly wasted. Further, the overall yield of the block is often limited by the depth of the minimum-thickness sample that has been punched.

Prior art methods of the production of microarray blocks also include high-yield approaches. See, for example, U.S. Pat. No. 8,911,682, the entire content of which is incorporated herein by this reference.

DESCRIPTION OF THE DRAWINGS

FIG. 7A is a schematic illustration of one step of one embodiment of a method of the present invention for creating high-yield cores for a microarray block wherein a liquid form of matrix material is dispensed from a pipette into a container to mix with cells in the container.

FIG. 7B is a schematic illustration of another step of one embodiment of a method of the present invention for creating high-yield cores for a microarray block wherein the liquid form of matrix material is mixed with the cells to form a mixture in the container.

FIG. 7C is a schematic illustration of another step of one embodiment of a method of the present invention for creating high-yield cores for a microarray block wherein a casting member is contracted relative to the container, for example the casting member is inserted into the container.

FIG. 7D is a schematic illustration of another step of one embodiment of a method of the present invention for creating high-yield cores for a microarray block wherein the casting member and the container are further relatively contracted.

FIG. 7E is a schematic illustration of another step of one embodiment of a method of the present invention for creating high-yield cores for a microarray block wherein casting member and the container are further relatively contracted, for example the casting member is further inserted into the container in order to propel or move the mixture from the container into a lumenal volume of the casting member to form a column of the mixture in the casting member.

FIG. 7F is a schematic illustration of another step of one embodiment of a method of the present invention for creating high-yield cores for a microarray block wherein the casting member containing the column of the mixture has been removed from the container. The matrix material contained in mixture may become solid or semi-solid during or between the steps of FIGS. 7E and 7F.

FIG. 7G is a schematic illustration of another step of one embodiment of a method of the present invention for creating high-yield cores for a microarray block wherein the column of mixture is being transferred from the casting member to a straightening element, for example the straightening element of FIGS. 6A-6C.

FIG. 7H is a schematic illustration of another step of one embodiment of a method of the present invention for creating high-yield cores for a microarray block wherein the column of mixture is made compatible with a subsequent embedding and/or sectioning process, for example while disposed in the straightening element.

FIG. 7I is a schematic illustration of another step of one embodiment of a method of the present invention for creating high-yield cores for a microarray block wherein a segment of a solidified core is inserted into a well of a recipient block.

FIG. 7J is a schematic illustration of another step of one embodiment of a method of the present invention for creating high-yield cores for a microarray block wherein a microarray block has been completed by filling all of the desired wells of the recipient block with solidified cores of the mixture.

FIG. 8E is a schematic illustration of one step of one embodiment of a method of the present invention for creating high-yield cores for a microarray block wherein the plunger is further advanced with respect to the container in order to propel or move the mixture from the container into the lumenal volume of the casting member to form a column of the mixture in the casting member.

FIG. 8F is a schematic illustration of another step of one embodiment of a method of the present invention for creating high-yield cores for a microarray block wherein the casting member containing the column of the mixture has been removed from the container. The matrix material contained in mixture may become solid or semi-solid during or between the steps of FIGS. 8E and 8F.

FIG. 8G is a schematic illustration of another step of one embodiment of a method of the present invention for creating high-yield cores for a microarray block wherein the column of mixture is being transferred from the casting member to a straightening element, for example the straightening element of FIGS. 6A-6C.

FIG. 8H is a schematic illustration of another step of one embodiment of a method of the present invention for creating high-yield cores for a microarray block wherein the column of mixture is made compatible with a subsequent embedding and/or sectioning process, for example while disposed in the straightening element.

FIG. 8I is a schematic illustration of another step of one embodiment of a method of the present invention for creating high-yield cores for a microarray block wherein a segment of a solidified core is inserted into a well of a recipient block.

FIG. 8J is a schematic illustration of another step of one embodiment of a method of the present invention for creating high-yield cores for a microarray block wherein a microarray block has been completed by filling all of the desired wells of the recipient block with solidified cores of the mixture.

FIG. 11A is a schematic illustration of one step of one embodiment of a method of the present invention, with internal hidden lines shown as dashed, for transferring a mixture from one embodiment of a container element of the present invention to the lumenal volume of one embodiment of a casting element of the present invention wherein an end of the casting element has been inserted into an end of the container element, with no sealing element at the interface between the casting element and the container element.

FIG. 11B is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein a plunger of the invention, for example carried by the container element, has been advanced so that the mixture in the container element is in contact with an end of the casting element.

FIG. 11C is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the plunger has been advanced to a position where the mixture in the container element has been partially transferred from a reservoir in the container element to a duct of the casting member.

FIG. 11D is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the plunger has been advanced to a position where the mixture has been fully or nearly fully transferred from the reservoir in the container element to the duct of the casting member.

DETAILED DESCRIPTION

Figure 1A:
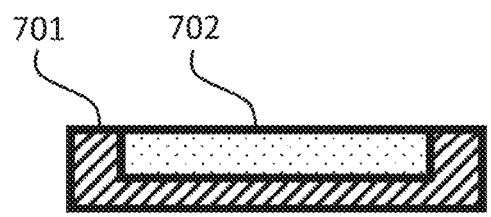
FIG. 1A is a schematic, cross-sectional side view of one step of a prior art method of microarray construction wherein sample material is embedded in an embedding medium.
Figure 1F:
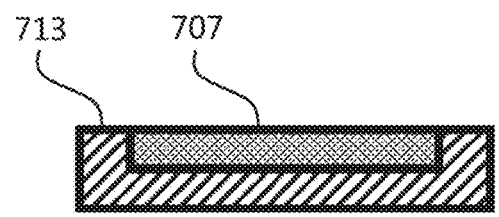
FIG. 1F is a schematic, cross-sectional side view of another step of a prior art method of microarray construction wherein a separate sample material is embedded in a medium.
Figure 1B:
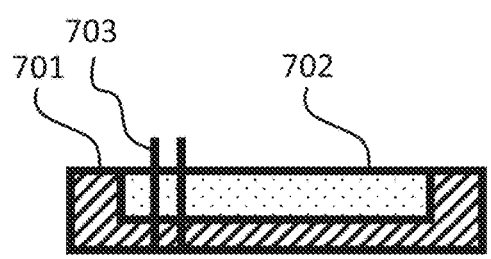
FIG. 1B is a schematic, cross-sectional side view of another step of a prior art method of microarray construction wherein a coring needle is inserted into the combined materials of FIG. 1A.
Figure 1G:
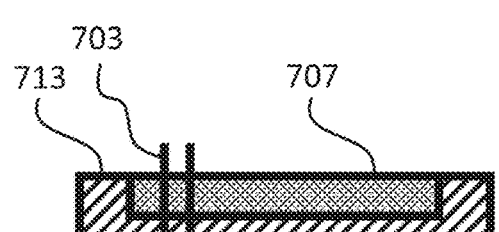
FIG. 1G is a schematic, cross-sectional side view of another step of a prior art method of microarray construction wherein a coring needle has been inserted into the combined materials of FIG. 1F.
Figure 1C:
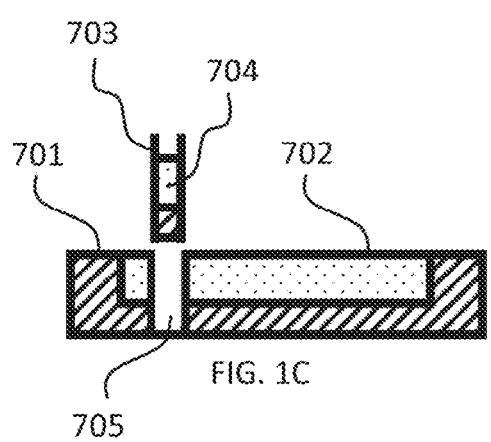
FIG. 1C is a schematic, cross-sectional side view of another step of a prior art method of microarray construction wherein a coring needle, now containing a core, has been retracted from the materials of FIG. 1A leaving a hole in the materials of FIG. 1A.
Figure 1H:
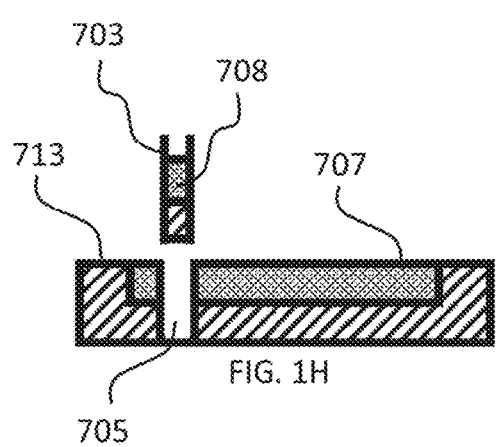
FIG. 1H is a schematic, cross-sectional side view of another step of a prior art method of microarray construction wherein a coring needle, now containing a core, has been retracted from the materials of FIG. 1F leaving a hole in the materials of FIG. 1F.
Figure 1D:
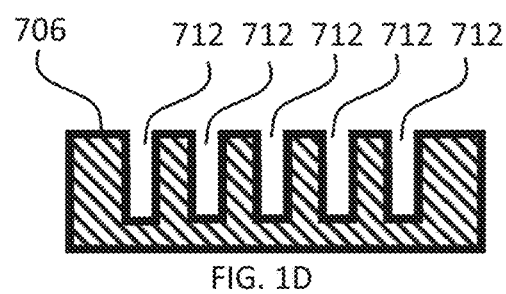
FIG. 1D is a schematic, cross-sectional side view of another step of a prior art method of microarray construction wherein a recipient block with wells is shown.
Figure 1I:
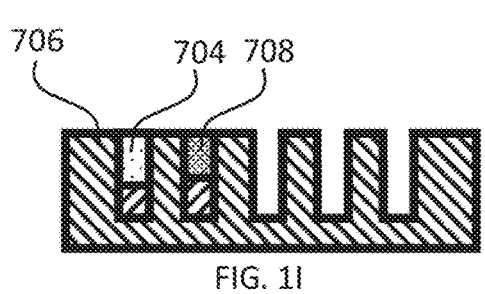
FIG. 1I is a schematic, cross-sectional side view of another step of a prior art method of microarray construction wherein the core of FIG. 1H has been placed in another one of the wells of the recipient well of FIG. 1D.
Figure 1E:
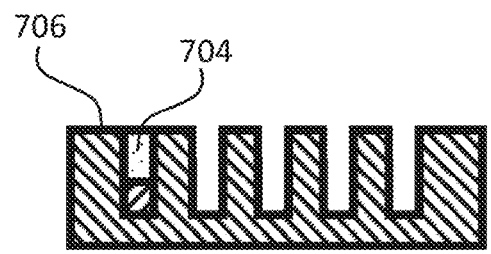
FIG. 1E is a schematic, cross-sectional side view of another step of a prior art method of microarray construction wherein the core of FIG. 1C has been placed in one of the wells of the recipient well of FIG. 1D.
Figure 1J:
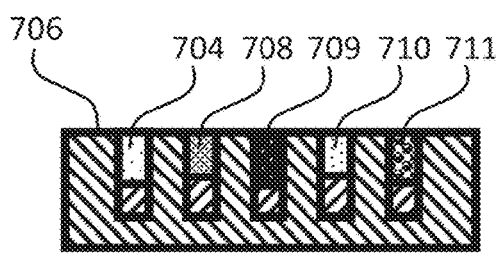
FIG. 1J is a schematic, cross-sectional side view of another step of a prior art method of microarray construction wherein the recipient block of FIG. 1D has been filled with further cores of sample material.
Figure 2A:
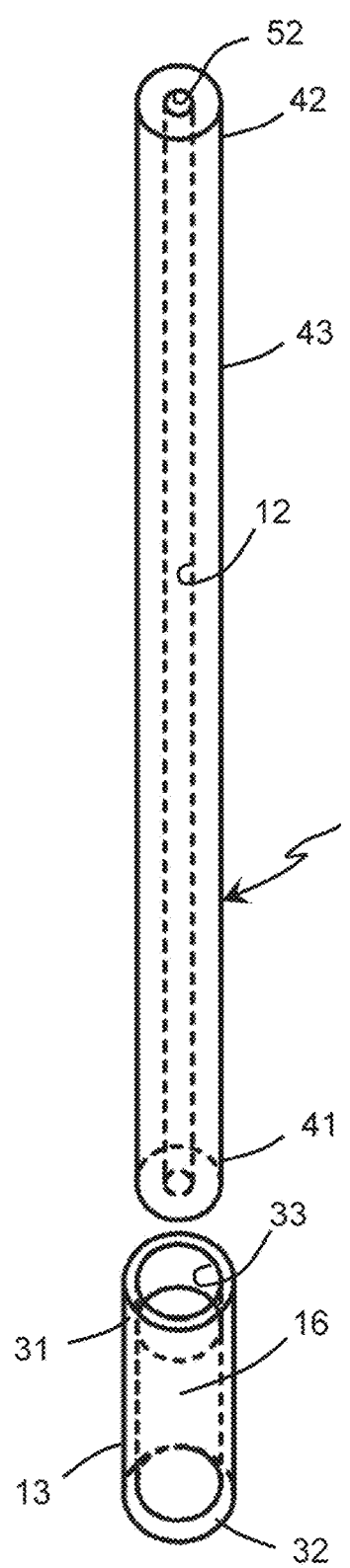
FIG. 2A is a perspective view, with internal hidden lines shown as dashed, of one embodiment of the apparatus of the present invention for creating of high-yield cores for a microarray block, more specifically a perspective view of one embodiment of a casting element and a container element of the present invention.
Figure 2B:
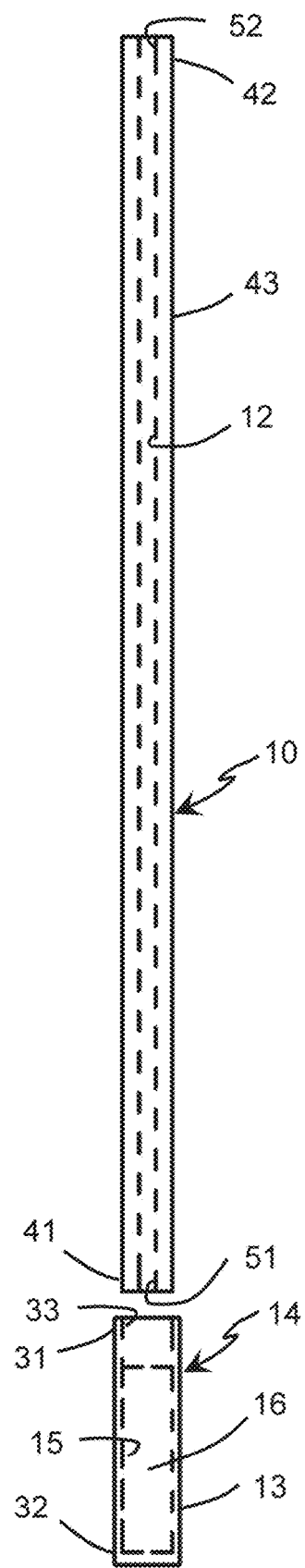
FIG. 2B is a side view, with internal hidden lines shown as dashed, of the casting element and container element of FIG. 2A shown prior to insertion of the casting element into an end of the container element.
Figure 2C:
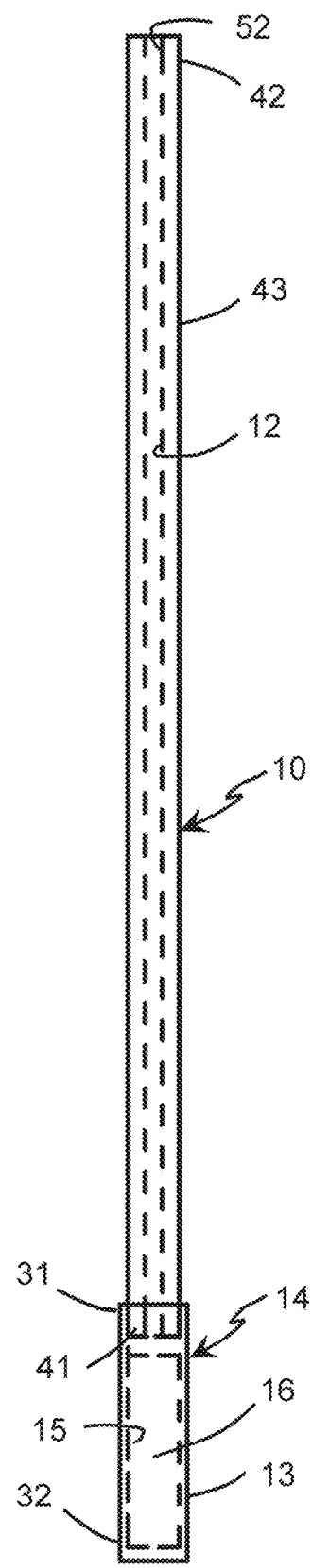
FIG. 2C is a side view, with internal hidden lines shown as dashed, of the casting element and container element of FIG. 2A shown after insertion of the casting element into the end of the container element, with no sealing element at the mating location of the casting element with the container element.

In any embodiment of the invention, an apparatus and method can be provided for forming cores containing a sample material, for example for use in a microarray block. In any embodiment, the apparatus can include a container for holding the sample material and a liquid matrix material and a tubular casting member for cooperatively engaging the container and receiving the sample material and the liquid matrix material from the container and forming a core of the sample material and matrix material. In any embodiment, the core can be a high-density core of the same material and the matrix material. In any embodiment, the sample material can be a biological material, for example tissue sample or cell cultures.

Any suitable ratio of sample material to liquid matrix material can be utilized. Ratios of sample material to liquid matrix material ranging from 1:100 to 100:1 can be utilized and provided. Ratios of sample material to liquid matrix material ranging from 1:3 to 3:1 can be utilized and provided. In this regard, where relatively few cells are required for a diagnosis, a corresponding low ratio of sample material to liquid matrix material can be utilized. For example, ratios in the range of approximating 1:100, for example in the case of disaggregated cells, may generate cell counts on the order of 100 in sections of a core diameter of two millimeters, which may be sufficient for some immune-histochemical diagnosis, for example. In certain instances, very dense sample material may be required. For example, a ratio of sample material to liquid matrix material of 100:1 could yield a nearly fully dense core of sample.

The embodiments of the invention set forth below are examples of the invention, and may in some instances be broader than the foregoing embodiment of the invention but are not intended to limit the breadth of the foregoing embodiment or the breadth of the invention. Additional features of the invention set forth in such embodiments are optional. A feature of any embodiment set forth below can be combined with the foregoing embodiment, with or without any other feature of any embodiment set forth below. All characteristics, steps, parameters and features of any method, process, apparatus, device or system described below are not limited to any specific embodiments set forth below, but instead are equally applicable to the foregoing embodiment of the invention and to all embodiments of the invention. Broad terms and descriptors are replaced in some instances with more specific terms and descriptors, not to limit a disclosure to a specific term or descriptor but merely for ease of discussion and understanding.

The apparatus or assembly of the invention can be of any suitable type, and in any embodiment, for example as illustrated in FIGS. 2-5, the container, for example container 14 or 20, can be a container member or element 13. The container element can have a cylindrical exterior or an exterior surface of any other suitable shape. The container element can be a cylindrical element 13. The container element 13 can have a reservoir therein, for example reservoir 15, for holding the mixture of sample material and the matrix material, for example matrix material 16. The container can be of any suitable solid material such as glass, plastic, metal, ceramic, or elastomer. The container element 13 can be tubular and be provided with opposite first and second ends 31, 32. In any embodiment, for example container 14, the first end 31 of the tubular container can be open, that can be provided with an opening 33, and the opposite second end 32 of the container can be closed. The reservoir can be of any suitable size or shape and in any embodiment can be a cylindrical bore 15 extending between the first and second ends of the tubular container. The opening 33 in the first end of the container can have a cross section that can be the same as the cross section of the cylindrical bore 15. In any embodiment, the bore 15 can have a circular cross section. In any embodiment, the container, for example container 14 or 20, can be capable of withstanding centrifugation.

In any embodiment, for example container 20, the second end 32 of the container or cylindrical member or element, for example container element 13, can have an opening or aperture 26 therein, for example a central aperture. In any embodiment, the container can include a plunging element or plunger 22 for moving the sample material and matrix material towards the opening 33 in the first end 31 of the container element 13. The plunging element can have a cross section approximating the internal cross section of the reservoir or cylindrical bore 15 of the container, for example to minimize sample material or matrix material extending between the plunger 22 and the internal surface 36 of the container. An urging or propulsion means or an urging or propulsion mechanism can be coupled to or carried by the container for exerting a force on the plunger so as to advance the plunger towards the opening in the first end of the container. The urging means or mechanism can be of any suitable type, such as a source of pressurized fluid coupled to the aperture 26 in the second end 32 of the container or a rod or post 24 coupled to the plunger 22 and extending through the aperture 26.

The tubular casting member 10 of the apparatus or assembly of the invention can be referred to as a second container or mold for forming the high-density core, which can be a high density cylindrical core. The tubular casting member can be referred to or described as a tubular casting element, an elongate member, a cylindrical member, a tubular member or a tube, and can be provided with opposite first and second ends 41, 42. The tubular casting member can be of any suitable solid material such as glass, plastic, metal, ceramic, or elastomer. In any embodiment, both the first end 41 and the second end 42 of the tubular casting member can be open. The tubular casting member can be of any suitable size or shape and in any embodiment can be a cylinder having an external cross section approximating the internal cross section of the container element 13 of the container. For example, the tubular casting member can have an external circular cross section. In any embodiment, the tubular casting member can have an external transverse dimension, such as an external diameter, that can be slightly less than the internal transverse dimension, such as internal diameter, of the container. In any embodiment, the first end 41 of the tubular casting member can slidably extend through the opening 33 in the first end 31 of the container element 13 of the container and through the cylindrical bore 15 of the container. For example, the outside or external surface 43 of the tubular casting member can slidably and sealably engage the inside or internal surface 36 of the bore 15 of the container. In this manner, the tubular casting member 10 and the container can move longitudinally relative to each other from an extended configuration to a contracted configuration. Certain extended configurations of the assembly or apparatus of the invention are illustrated in the first side views of FIGS. 2-5 and certain contracted configurations of the assembly or apparatus of the invention are illustrated in the second side views of FIGS. 2-5.

Figure 3A:
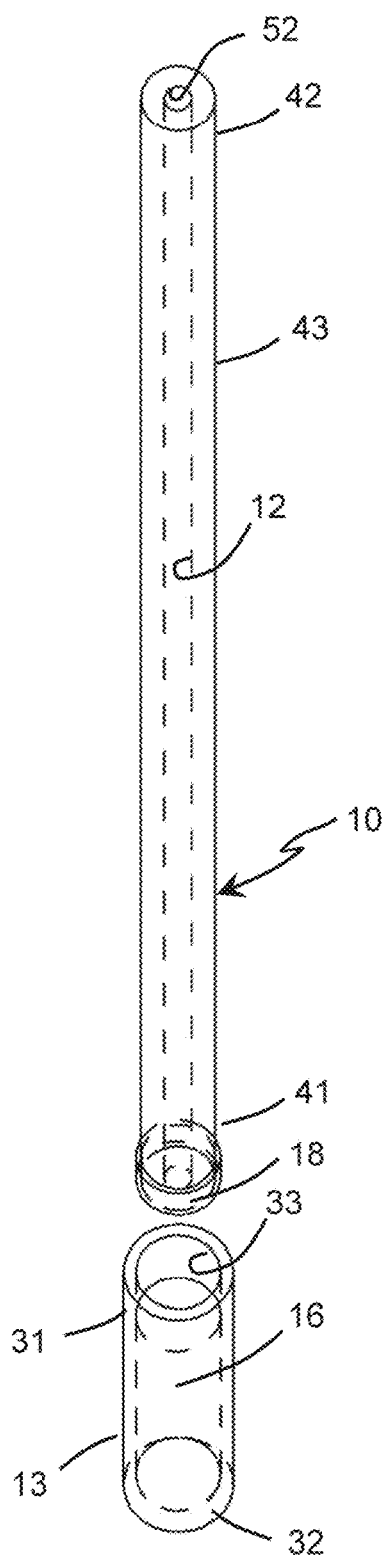
FIG. 3A is a perspective view, with internal hidden lines shown as dashed, of one embodiment of the apparatus of the present invention for creating of high-yield cores for a microarray block, more specifically a perspective view of one embodiment of a casting element and a container element of the present invention, with one embodiment of a sealing element at one end of the casting element.
Figure 3B:
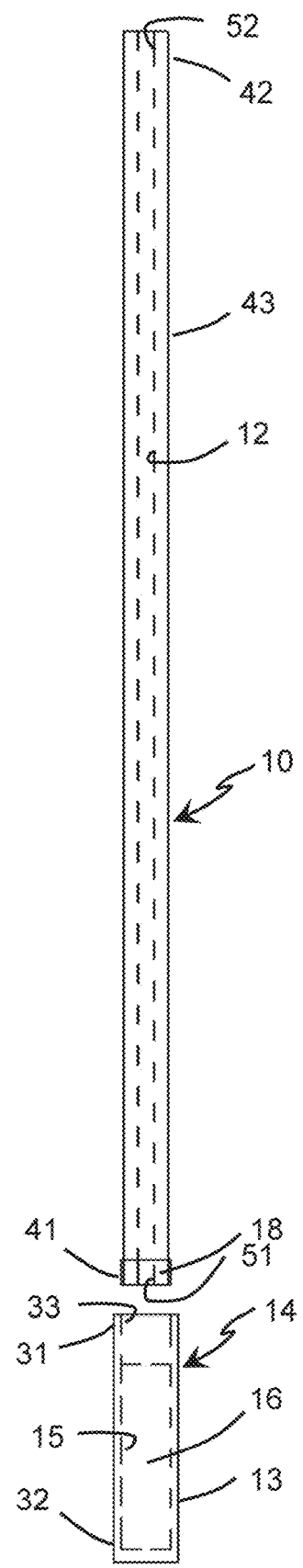
FIG. 3B is a side view, with internal hidden lines shown as dashed, of the casting element and container element of FIG. 3A shown prior to insertion of the casting element into an end of the container element.
Figure 3C:
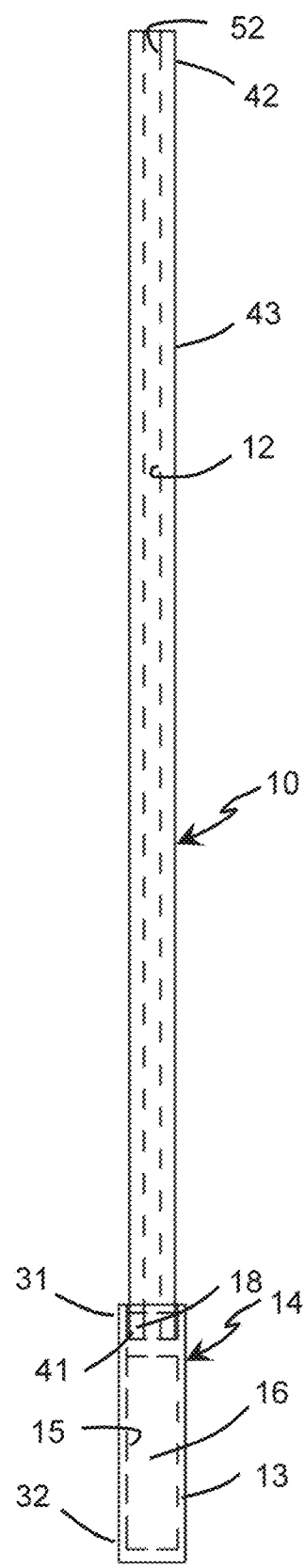
FIG. 3C is a side view, with internal hidden lines shown as dashed, of the casting element and container element of FIG. 3A shown after insertion of the casting element into the end of the container element, the sealing element positioned at the interface of the casting element and the container element.
Figures 4A, 4B:
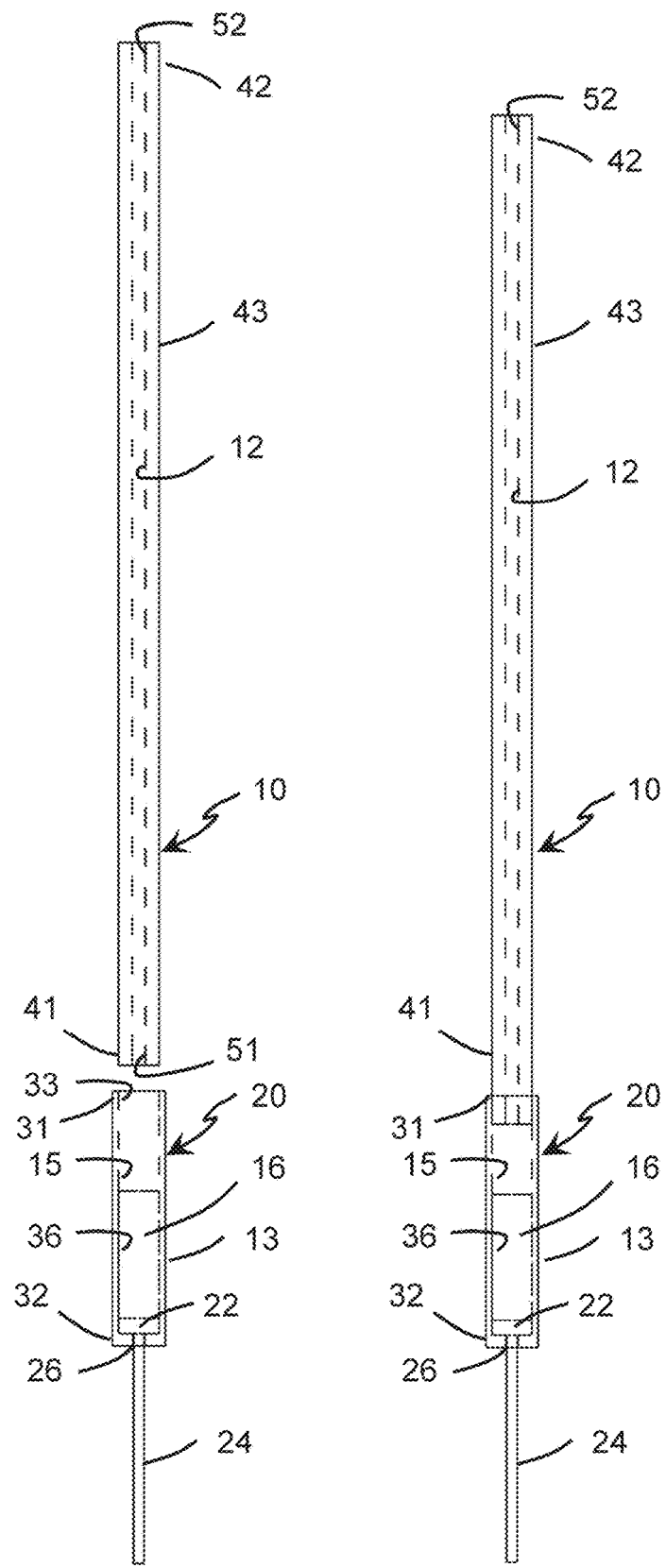
FIG. 4A is a side view, with internal hidden lines shown as dashed, of one embodiment of the apparatus of the present invention for creating of high-yield cores for a microarray block, more specifically a side view of one embodiment of a casting element and a container element of the present invention shown prior to insertion of the casting element into an end of the container element.
FIG. 4B is a side view, with internal hidden lines shown as dashed, of the casting element and container element FIG. 4A shown after insertion of the casting element into the end of the container element, with no sealing element at the mating location of the casting element with the container element. One embodiment of a plunger is attached to one embodiment of a plunger rod, which passes through an aperture of the container element.
Figures 5A, 5B:
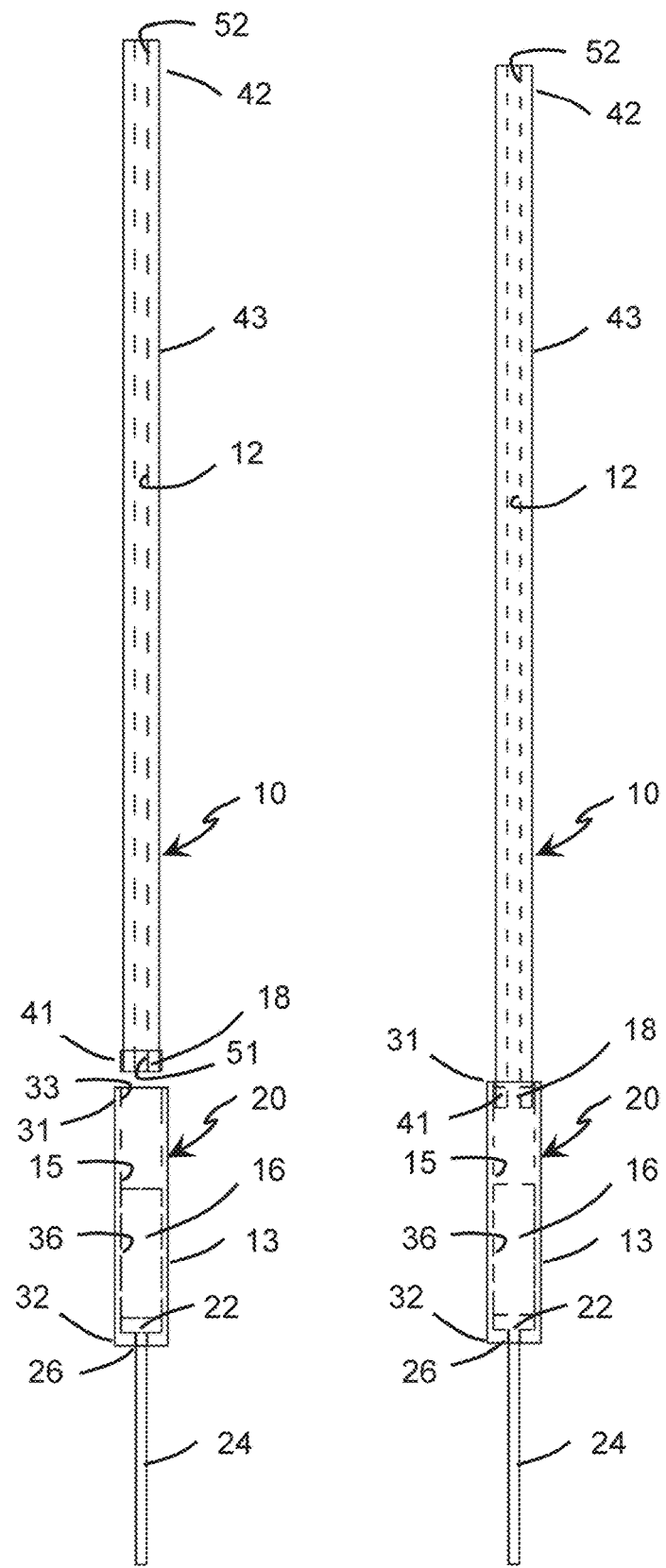
FIG. 5A is a side view, with internal hidden lines shown as dashed, of one embodiment of the apparatus of the present invention for creating of high-yield cores for a microarray block, more specifically a side view of one embodiment of a casting element and a container element of the present invention shown prior to insertion of the casting element into an end of the container element.
FIG. 5B is a side view, with internal hidden lines shown as dashed, of the casting element and container element FIG. 5A shown after insertion of the casting element into the end of the container, with one embodiment of a sealing element positioned at the interface of casting the element and the container element. One embodiment of a plunger is attached to one embodiment of a plunger rod, which passes through an aperture of the container element.

In any embodiment, a suitable sealing element or seal, for example seal 18, can be provided around the first end 41 of the tubular casting member 10, within the tubular bore 15 of the container element 13 of the container for example at the first end 31 of the container or both for enhancing a fluid-tight seal between the outside of the tubular casting member 10 and the inside of the bore of the container, including during slidable movement of the tubular casting member relative to the container (see FIGS. 3 and 5). The seal can be made from any suitable material, such as a silicone or other elastomeric material.

In any embodiment, the seal between casting element 10 and container element 13 need not involve insertion. For example, such a seal may be achieved via contact between the faces at the tips of end 41 of casting element and end 31 of container element, respectively, with or without a sealing element such as a gasket at the interface.

The internal surface of the casting member 10 can form a channel or duct 12 with a given size and shape. The cross-sectional size and shape of the internal surface may be constant throughout the length of the casting member, for example a cylinder, and in any embodiment can be a circular cylinder. The duct or bore 12 within the casting member can communicate with a first opening 51 at the first end 41 of the casting member and a second opening 52 at the second end 42 of the casting member.

Figure 6A:
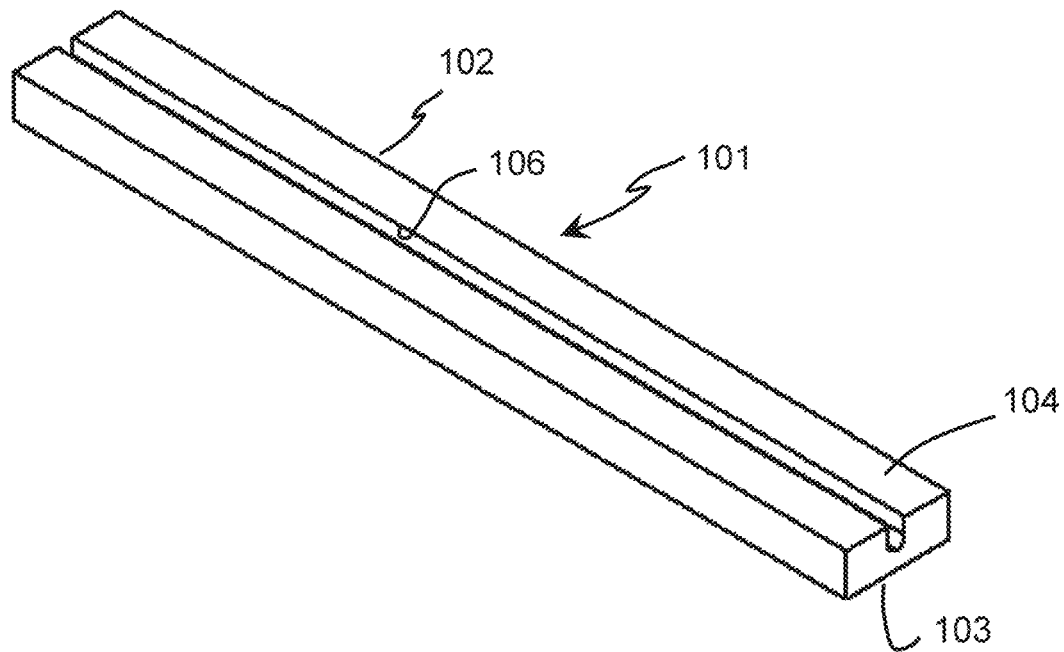
FIG. 6A a perspective, top view of one embodiment of a long-aspect-ratio straightening element of the present invention having a groove in the top surface thereof. A lid may optionally be attached to the top surface to contain a core placed in the groove, for example during the processes illustrated in FIG. 7 or 8.
Figure 6B:
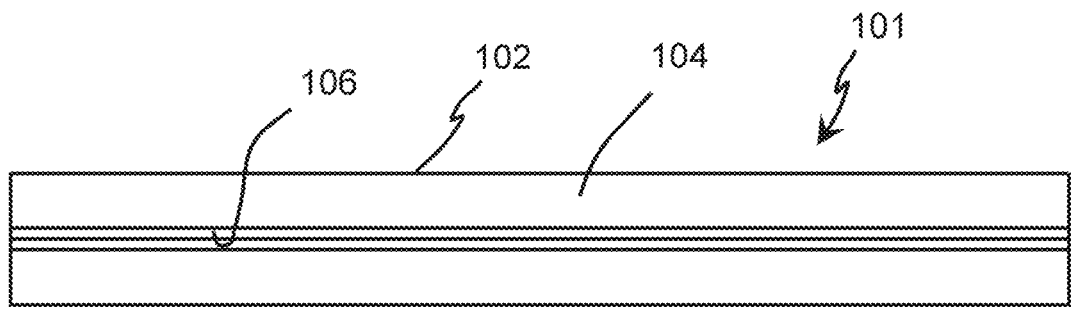
FIG. 6B a top view of the long-aspect-ratio straightening element of FIG. 6A.
Figure 6C:
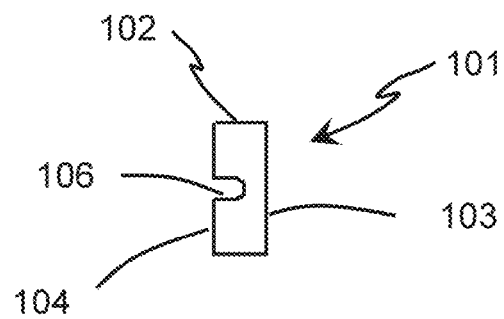
FIG. 6C an end view of the long-aspect-ratio straightening element of FIG. 6A.
Figure 8D:
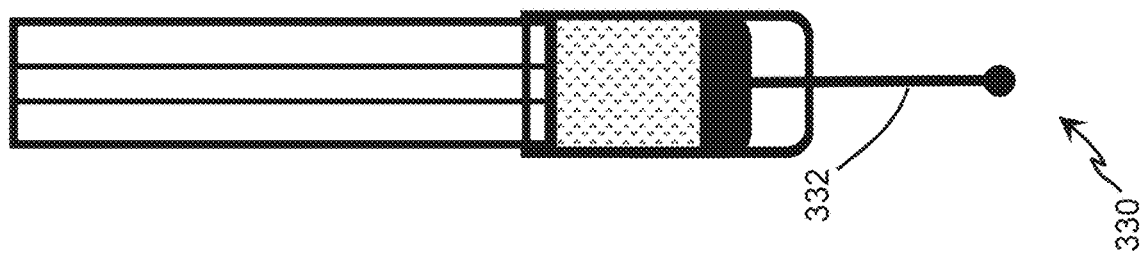
FIG. 8D is a schematic illustration of one step of one embodiment of a method of the present invention for creating high-yield cores for a microarray block wherein a plunger is advanced with respect to the container to move the mixture in the container closer to the casting member.
Figure 8C:
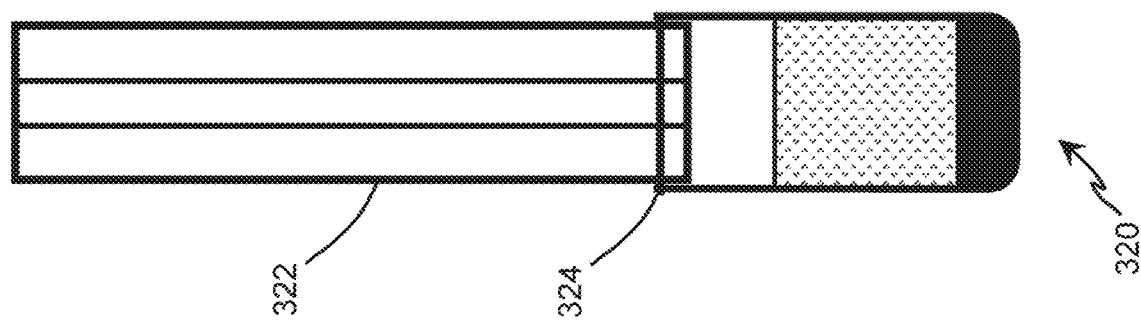
FIG. 8C is a schematic illustration of one step of one embodiment of a method of the present invention for creating high-yield cores for a microarray block wherein a casting member is contracted relative to the container, for example the casting member is inserted into the container
Figure 8B:
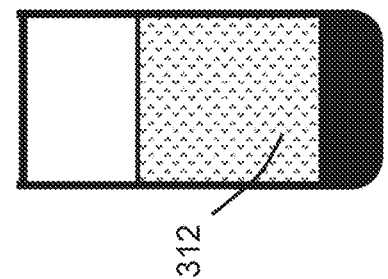
FIG. 8B is a schematic illustration of one step of one embodiment of a method of the present invention for creating high-yield cores for a microarray block wherein the liquid form of matrix material is mixed with the cells to form a mixture in the container.
Figure 8A:
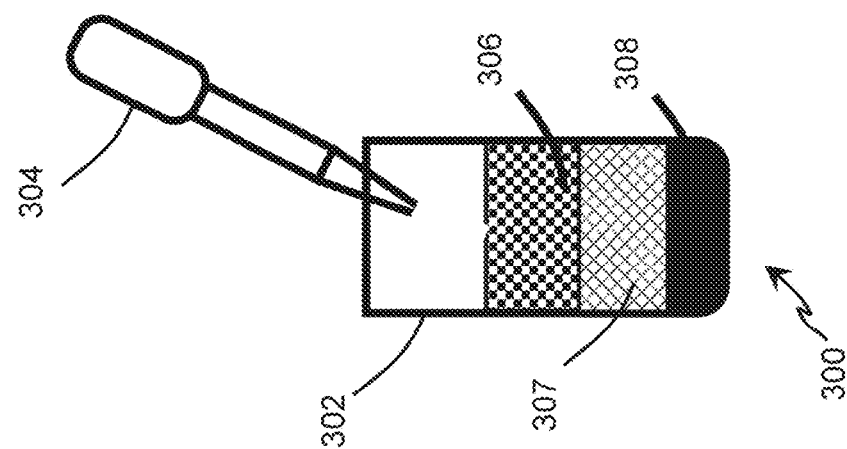
FIG. 8A is a schematic illustration of one step of one embodiment of a method of the present invention for creating high-yield cores for a microarray block wherein a liquid form of matrix material is dispensed from a pipette into a container to mix with cells in the container.
Figure 9A:
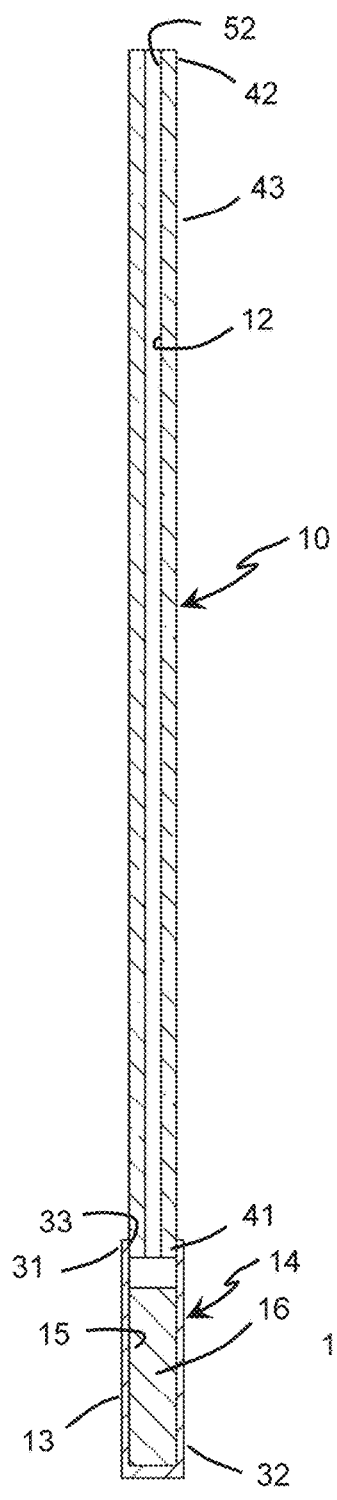
FIG. 9A is a schematic illustration of one step of one embodiment of a method of the present invention, with internal hidden lines shown as dashed, for transferring a mixture from one embodiment of a container element of the present invention to the lumenal volume of one embodiment of a casting element of the present invention wherein an end of the casting element has been inserted into an end of the container element, with no sealing element at the interface between the casting element and the container element.
Figure 9B:
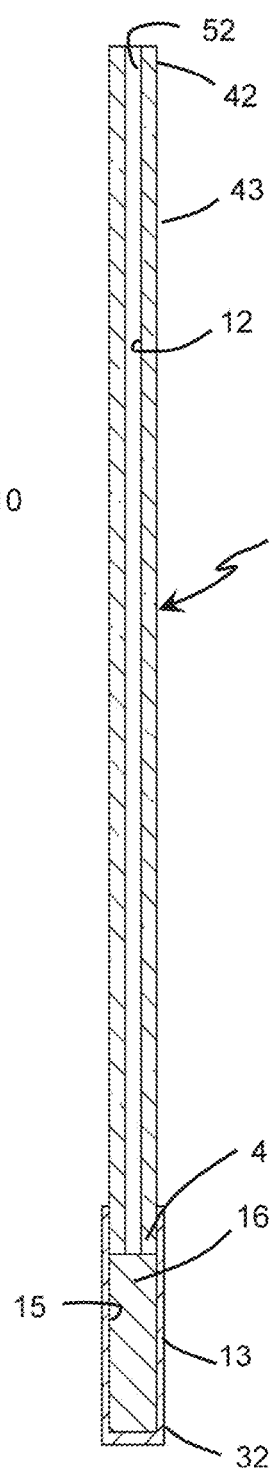
FIG. 9B is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the casting element has been advanced to the point of contact with the mixture in the container element.
Figure 9C:
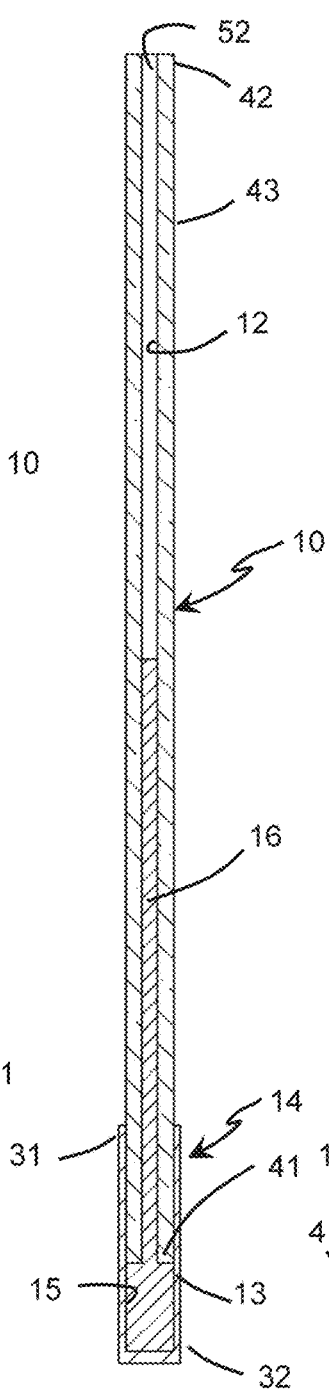
FIG. 9C is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the casting element has been advanced to a position where the mixture in the container element has been partially transferred from a reservoir in the container element to a duct of the casting member.
Figure 9D:
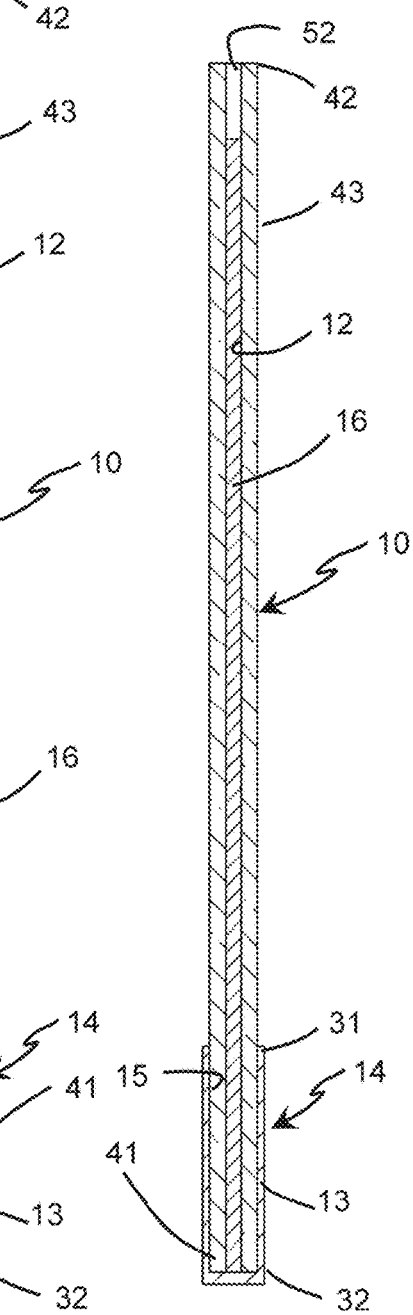
FIG. 9D is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the casting element has been advanced to a position where the mixture has been fully or nearly fully transferred from the reservoir in the container element to the duct of casting member.
Figure 10A:
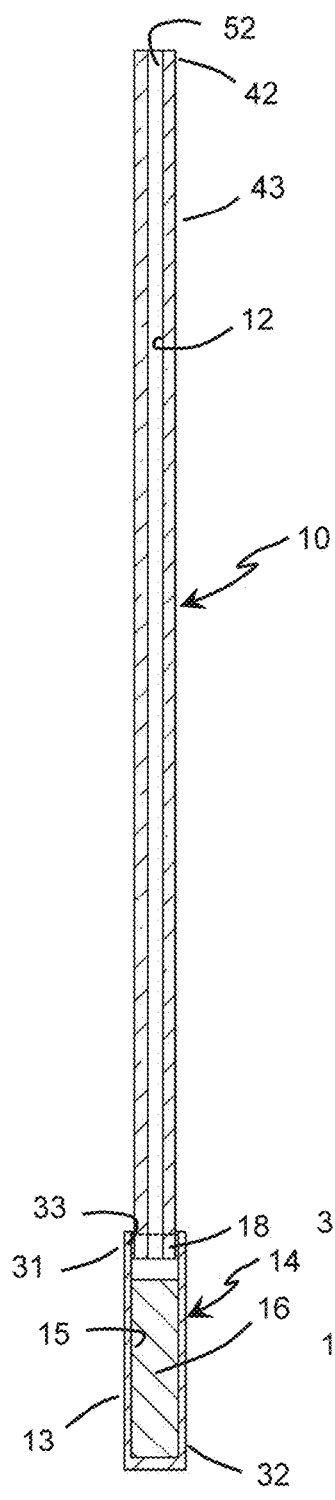
FIG. 10A is a schematic illustration of one step of one embodiment of a method of the present invention, with internal hidden lines shown as dashed, for transferring a mixture from one embodiment of a container element of the present invention to the lumenal volume of one embodiment of a casting element of the present invention wherein an end of the casting element has been inserted into an end of the container element, with a sealing element at the interface between the casting element and the container element.
Figure 10B:
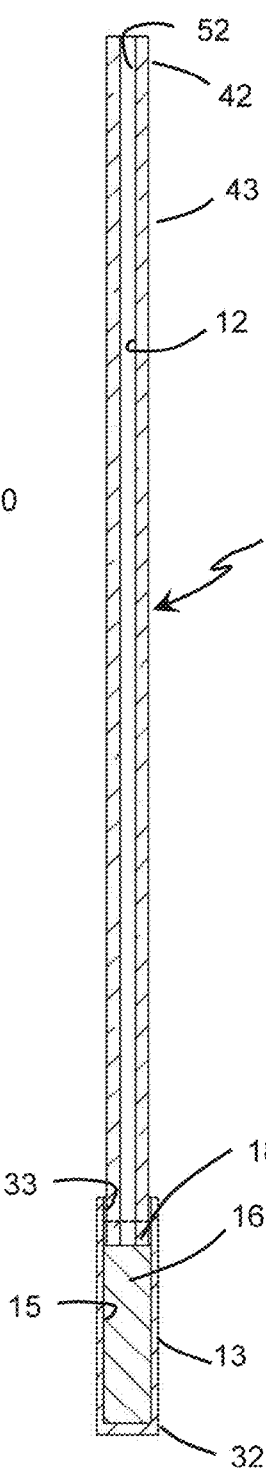
FIG. 10B is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the casting element has been advanced to the point of contact with the mixture in the container element.
Figure 10C:
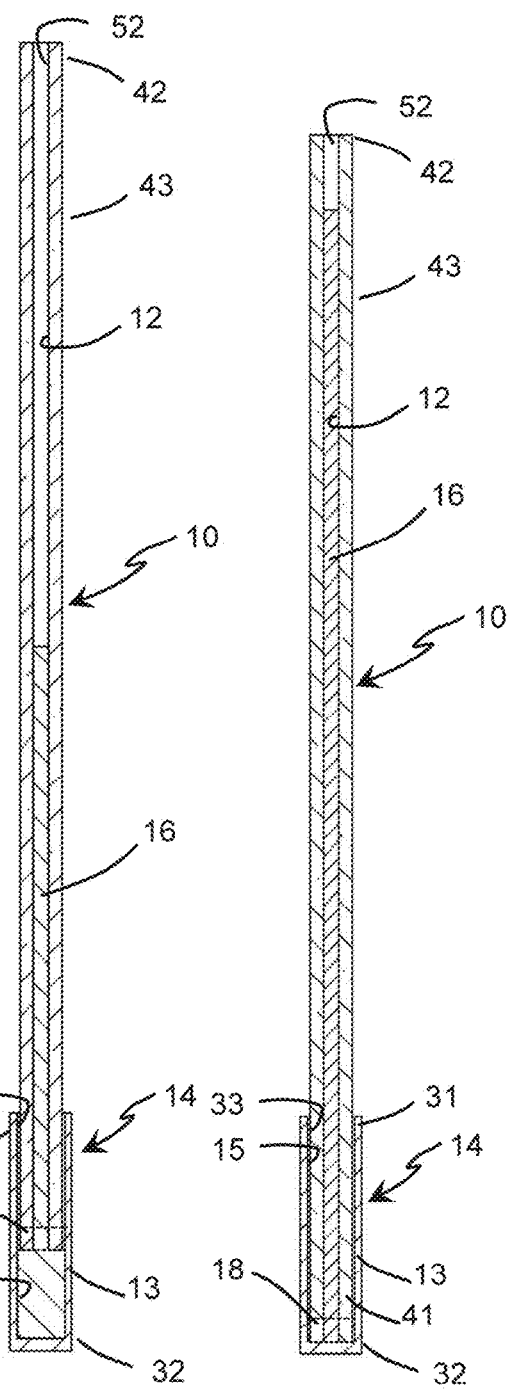
FIG. 10C is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the casting element has been advanced to a position where the mixture in the container element has been partially transferred from a reservoir in the container element to a duct of the casting member.
Figure 10D:
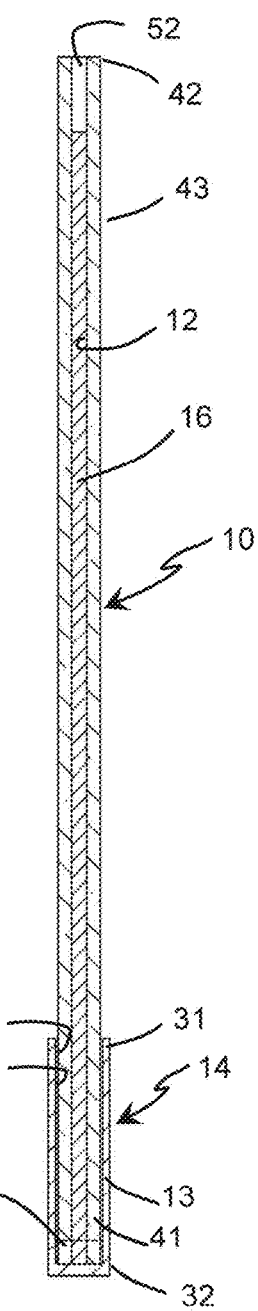
FIG. 10D is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the casting element has been advanced to a position where the mixture has been fully or nearly fully transferred from the reservoir in the container element to the duct of casting member.

Another structure of the present invention is a long-aspect-ratio cassette or other straightening element (see FIG. 6) that contains and supports the core after it is removed from the casting member. The straightening element can be of any suitable type. In any embodiment, a straightening element or device 101 can be provided formed from an elongate support structure 102 made from any suitable material such as a rigid or flexible plastic, ceramic, metal or elastomer. The straightening element can be referred to as a cassette. The structure 102 can have a bottom surface 103, that can be planar, and a top surface 104 provided with an elongate groove or channel 106 formed therein. In any embodiment, the channel 106 can have a length at least equal to the core of the sample material and a transverse dimension at least equal to the width or transverse dimension of the core.

One method of forming a microarray block of the invention, for example a cell microarray block, is illustrated schematically in FIGS. 7-8. The method of FIG. 7 can utilize any suitable container and casting member, such as container 14 and casting member 10. The method of FIG. 8 can utilize any suitable container and casting member, such as container 20 and casting member 10. In step 300, pipette(s) or other suitable dispenser(s) 304 can be used to place a combination of cells 306 and the liquid form of a suitable matrix material 307 into the container 302, for example containers 14 or 20. In any embodiment, the cells and liquid can form of the matrix material may be mixed prior to placing it into the container. In the method of FIG. 8, a plunging element 308 exists within the container, for example plunging element 22. Step 310 depicts the mixture 312 of cells and liquid form of the matrix material in the container. In step 320, the casting member 322, for example casting member 10, is shown upon insertion into an open end of the container. In these diagrams, a sealing element 324, for example seal 18, can be provided to facilitate a fluid-tight seal between the casting element and the container. In any embodiment, a sufficient seal may be achieved without the use of such a sealing element. In step 330, one element can be advanced toward another in such a way as to bring the surface of the fluid mixture 312 into contact with the casting element 322. In the embodiment of FIG. 7, said contact can be achieved by advancing the casting element with respect to the container. In the embodiment of FIG. 8, said contact can be achieved by advancing the plunging element 308 with respect to the casting element. In step 340, the respective relative contraction of the container and casting member, for example the insertion of the casting member into the container, are continued to such an extent as to propel or transfer the mixture 312 into the lumen of the casting element, resulting in a column 342 of the mixture of cells and liquid matrix, which can be referred to as a cylinder, assuming the shape of the lumen, channel, duct or bore of the casting element. Subsequently, column 342 can be allowed to solidify, for example by means of cooling or other mechanism, causing solidification of the matrix material. Subsequent to solidification of column 342, the casting element may be removed from contact with the container as depicted in step 350. This step is optional, as the system may be designed to enable step 360 and/or 370 without said removal of contact between casting element and container. In step 360, the solid core can be removed from the casting element after solidification. As depicted, depending upon the mechanical properties of the solidified matrix material, the core may be highly flexible. In any embodiment, a specialized straightening element 362, for example straightening element 101 illustrated in FIG. 6, can receive the solidified core in step 360. The use of said straightening element is optional in the method.

In step 370, the solidified core can be made compatible with the embedding material, for example item or recipient block 386 in step 380, of the final microarray block. The recipient block can be made from any suitable material including paraffin wax, an agarose gel and a polymeric medium. As used herein, the term made compatible can represent the establishment of properties in a material pair (core and embedding material) between which a bond may be formed with sufficient strength to enable sections of the block to be cut which have physical integrity. In any embodiment where the embedding material of the block 386 can be paraffin and the core's matrix material can be agarose gel, step 370 may involve dehydration followed by paraffin infiltration of the agarose gel. The device represented by item 372 in step 370 may be a standard "tissue processing" instrument from the histology industry. The result of step 370 can be the core 382 having been made compatible with the embedding material of block 386.

Step 380 shows, in sectional side view, a segment from the core 382 being placed into an existing recipient block 386 mounted on a histologic cassette 388. The segment created by parting the core along the line 384, can be formed by any suitable means, for example using a scalpel or other blade. The segment can be formed either before or after its placement in the respective bore of the recipient block. Step 390 shows, in top view, a resulting microarray block. A suitable bonding step, for example a heating step, may be incorporated after step 380 in order to enhance the bond between the recipient block and the cores placed therein. In any embodiment, other steps such as polymerization of the embedding medium may be incorporated after step 380 in order to enhance the bond between the recipient block and the cores. A polymerization step may be desirable, for example, where the recipient block can be formed from a polymeric medium. Other methods may be used for embedding or disposing the cores within the embedding material, for example molding or otherwise forming a block around the cores. In any embodiment, for example, the cores may be held in a desired configuration within a mold and a liquid form of the embedding material can be introduced into the mold and allowed to solidify.

Figures 12A, 12B, 12C, 12D:
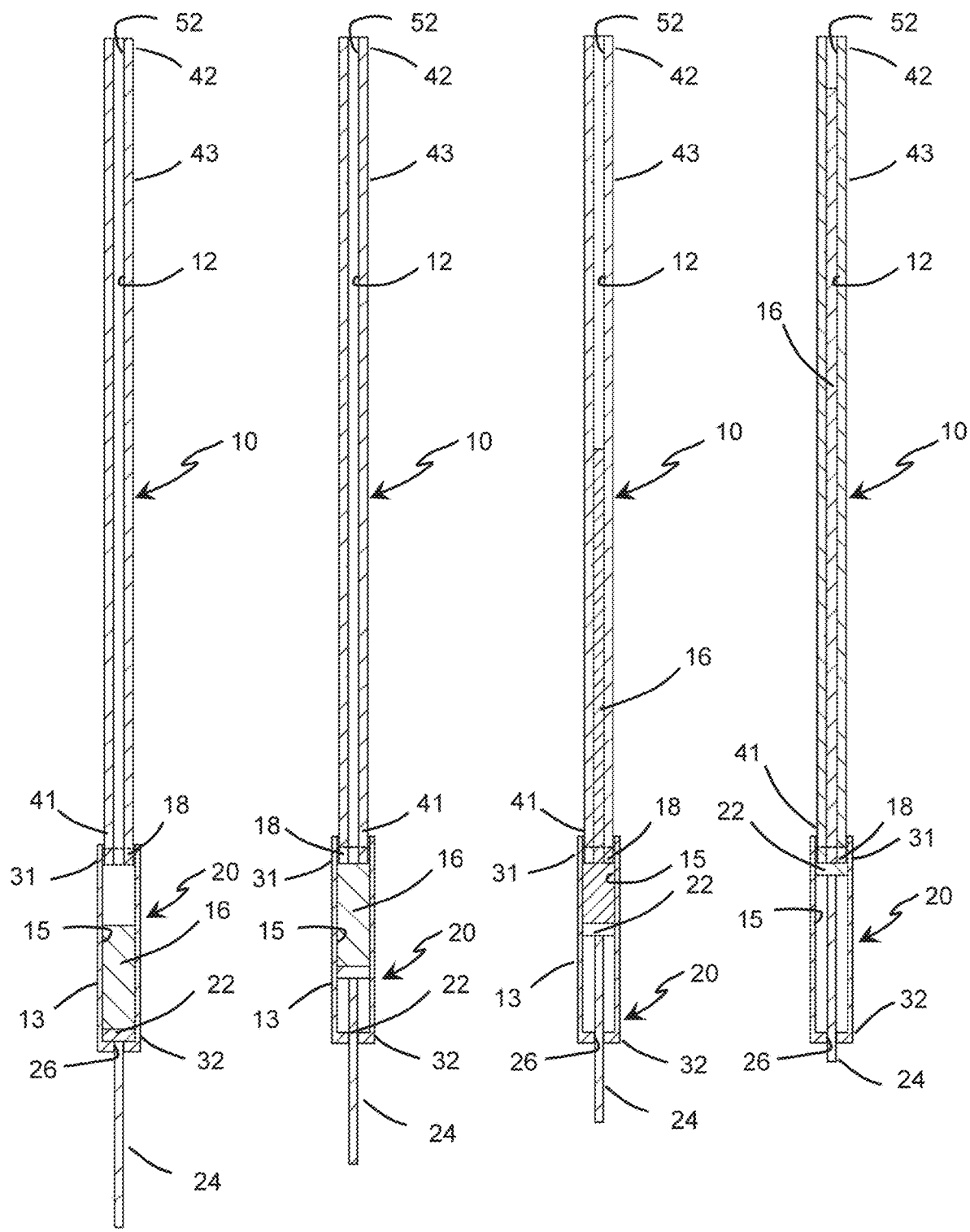
FIG. 12A is a schematic illustration of one step of one embodiment of a method of the present invention, with internal hidden lines shown as dashed, for transferring a mixture from one embodiment of a container element of the present invention to the lumenal volume of one embodiment of a casting element of the present invention wherein an end of the casting element has been inserted into an end of the container element, with a sealing element at the interface between the casting element and the container element.
FIG. 12B is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein a plunger of the invention, for example carried by the container element, has been advanced so that the mixture in the container element is in contact with an end of the casting element.
FIG. 12C is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the plunger has been advanced to a position where the mixture in the container element has been partially transferred from a reservoir in the container element to a duct of the casting member.
FIG. 12D is a schematic illustration of another step of one embodiment of a method of the present invention, with internal hidden lines shown as dashed, for transferring a mixture from one embodiment of a container element of the present invention to the lumenal volume of one embodiment of a casting element of the present invention wherein the plunger has been advanced to a position where the mixture has been fully or nearly fully transferred from the reservoir in the container element to the duct of the casting member.
Figure 13:
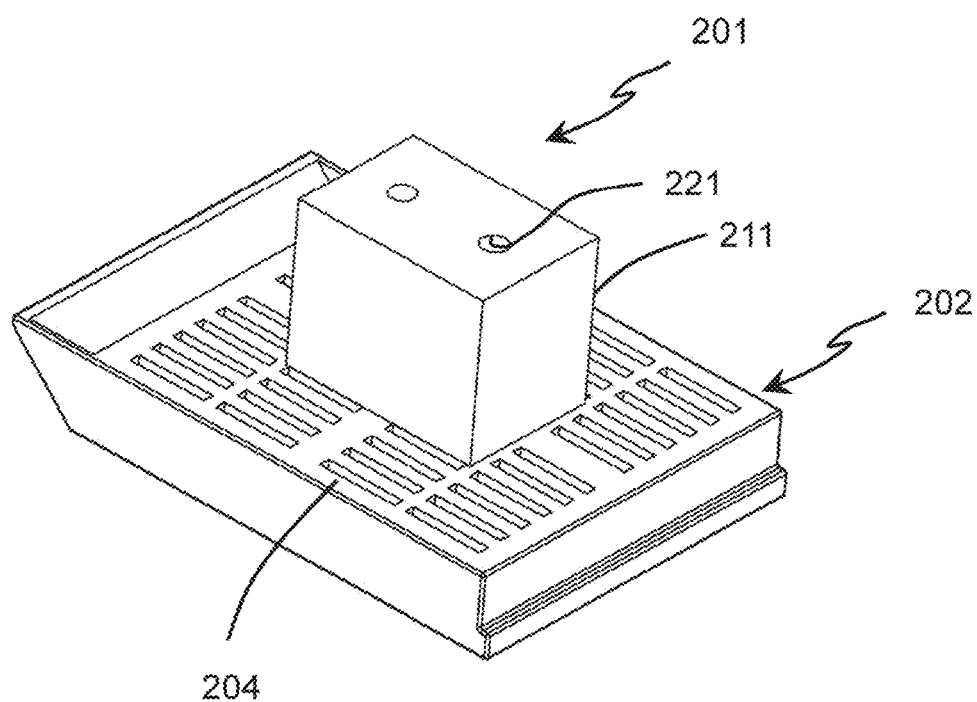
FIG. 13 is a perspective view of one embodiment of a microarray recipient block of the present invention, with wells formed therein, together with a histologic cassette.
Figure 14:
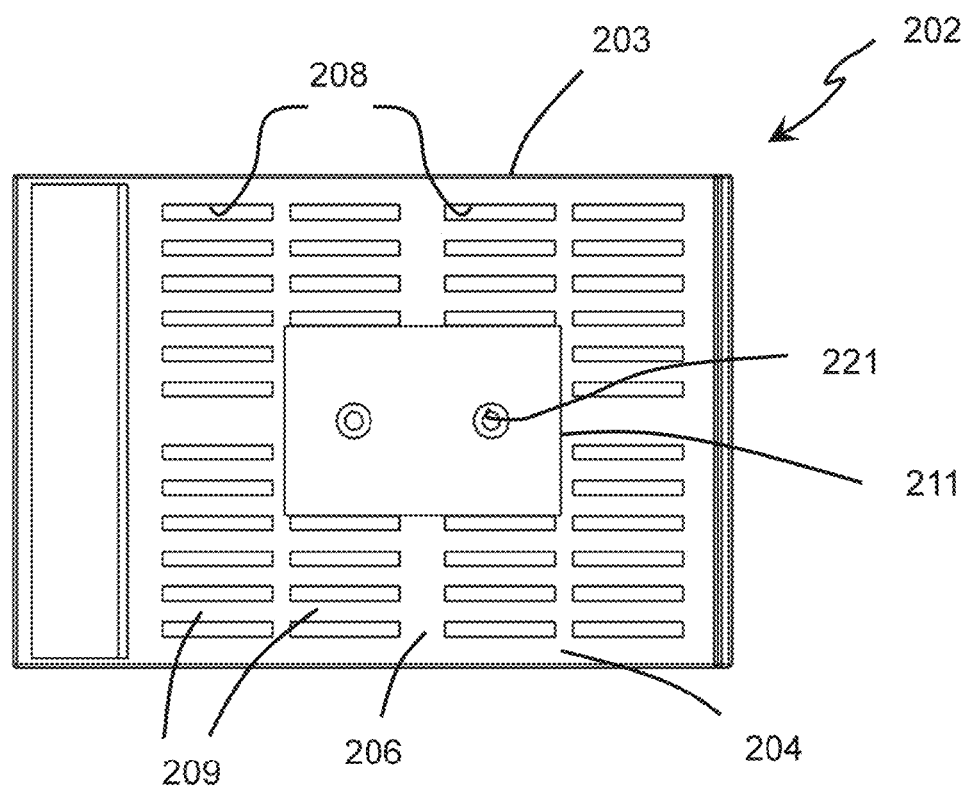
FIG. 14 is a top view of the microarray recipient block and histologic cassette of FIG. 13.
Figure 15:
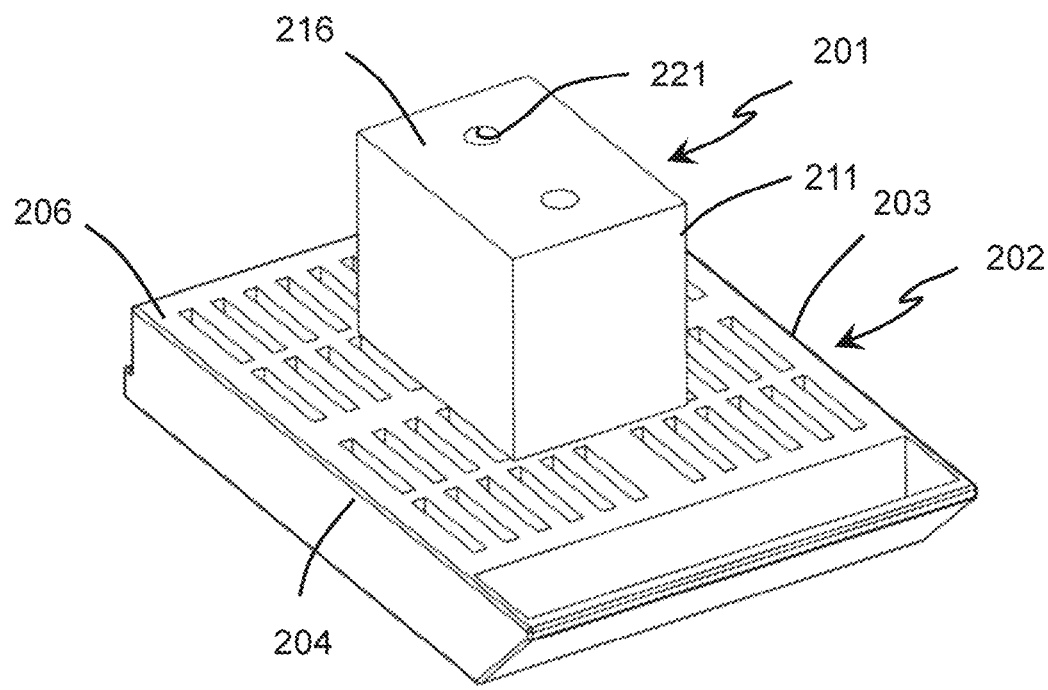
FIG. 15 is a perspective view, from an opposite angle, of the microarray recipient block and histologic cassette of FIG. 13.
Figure 16:
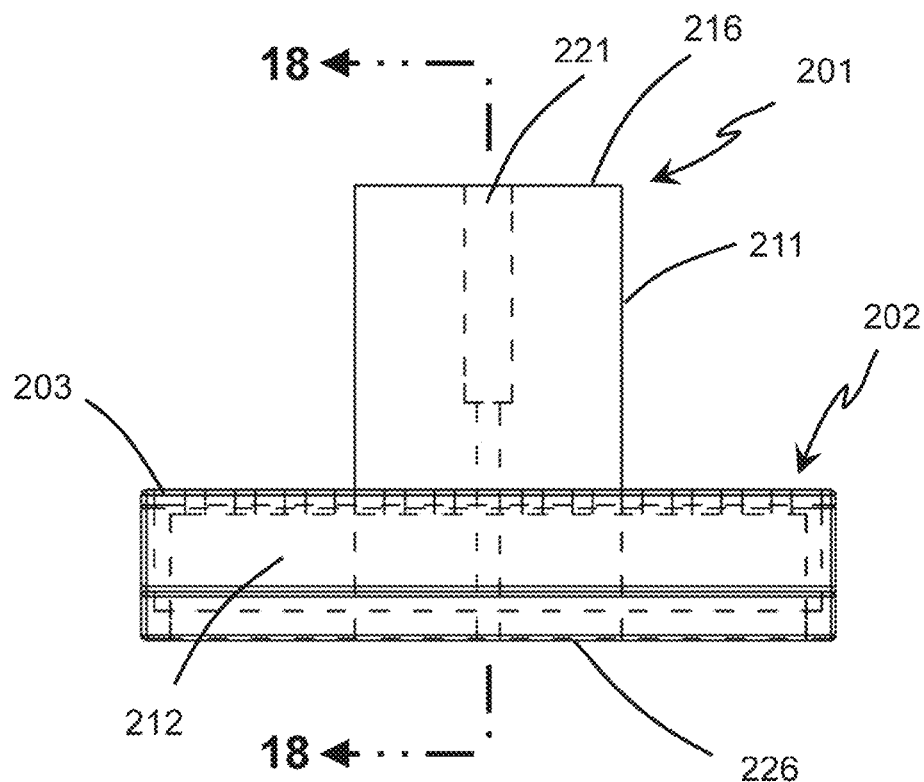
FIG. 16 is a front view, with hidden lines shown dashed, of the microarray recipient block and histologic cassette of FIG. 15.
Figure 17:
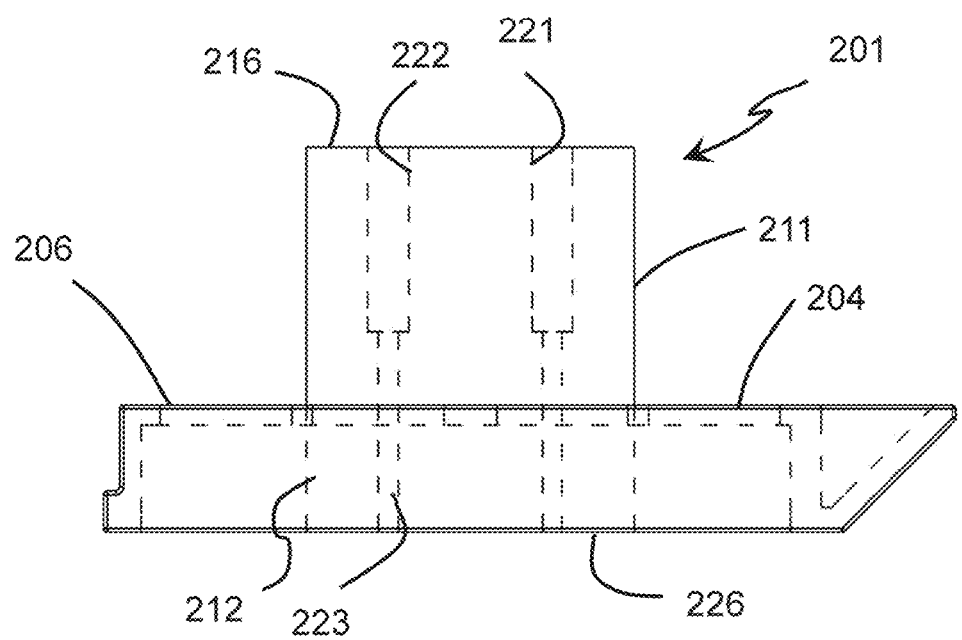
FIG. 17 is a side view, with hidden lines shown dashed, of the microarray recipient block and histologic cassette of FIG. 15.
Figure 18:
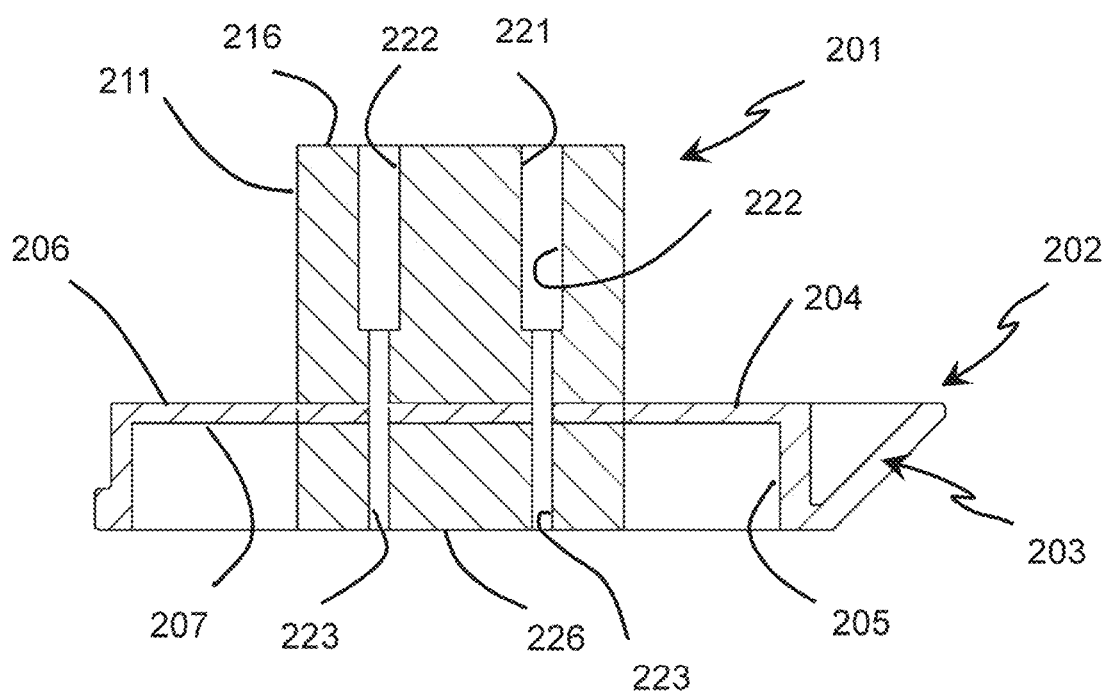
FIG. 18 is a cross-sectional view, taken along the line 18-18 of FIG. 16, of the microarray recipient and histologic cassette block of FIG. 15, showing the wells of the recipient block, the interlocked connection of the recipient block with the histologic cassette, and the optional through-holes of the recipient block.
Figure 19:
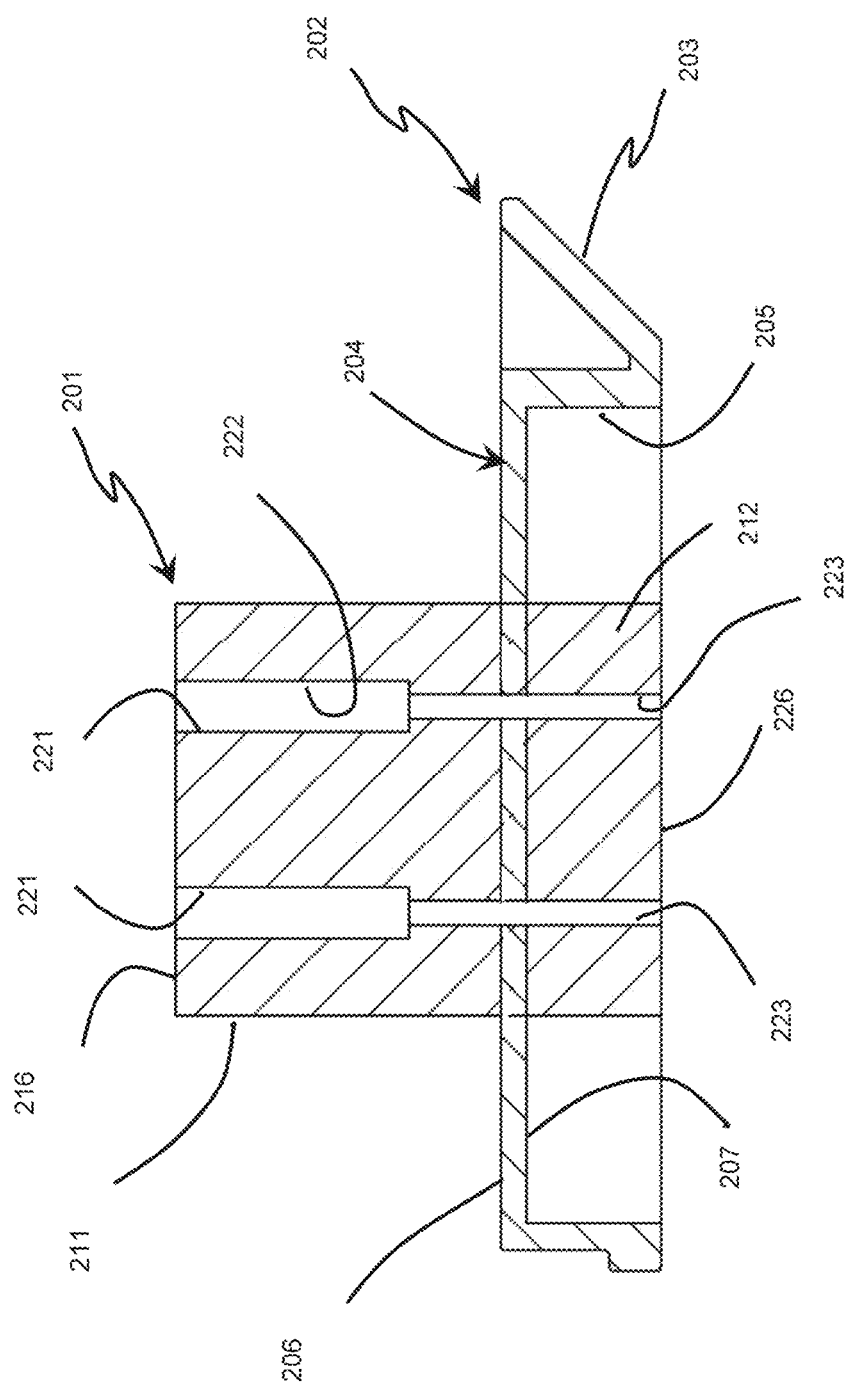
FIG. 19 is an enlarged side cross-sectional view, similar to the side cross-sectional view of FIG. 18, of the microarray recipient block and histologic cassette of FIG. 15.
Figure 20:
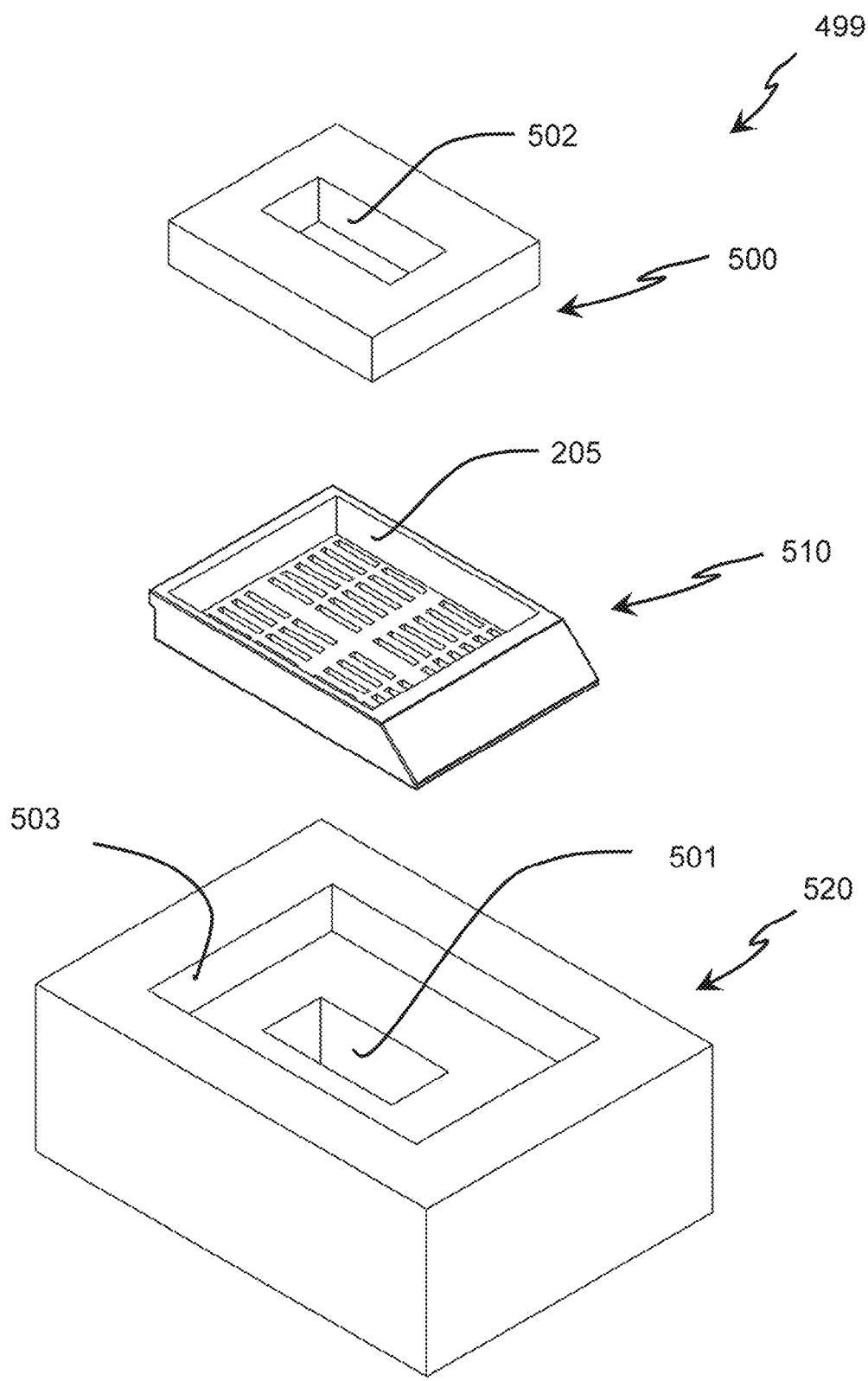
FIG. 20 is an exploded perspective view of one embodiment of a casting-mold system for creating a recipient block and histologic cassette assembly, for example similar to the microarray recipient block and histologic cassette assembly of FIG. 13, and includes a mold, the histologic cassette and an optional mold insert.
Figure 21:
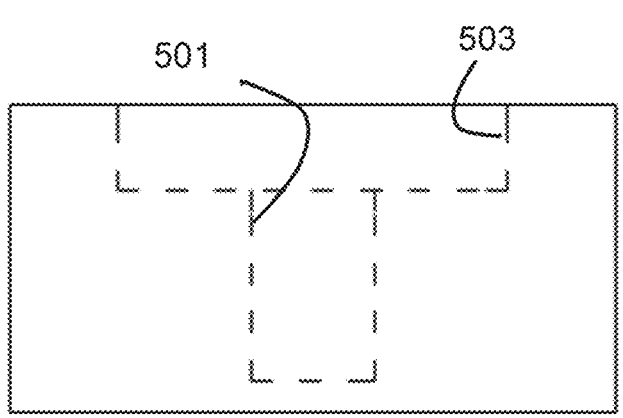
FIG. 21 is a front view, with hidden lines shown dashed, of the casting-mold system of FIG. 20.
Figure 22:
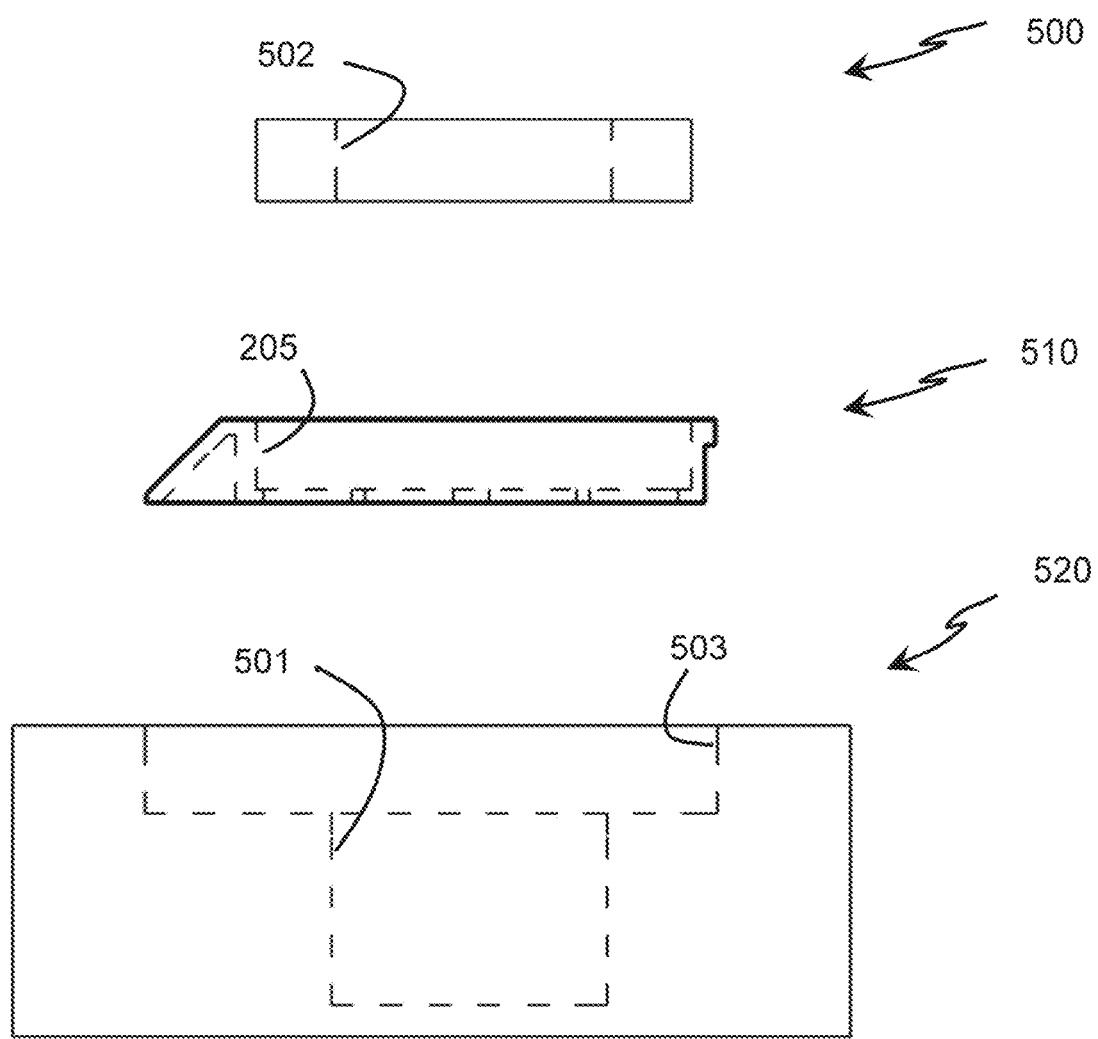
FIG. 22 is a side view, with hidden lines shown dashed, of the casting-mold system of FIG. 20.
Figure 23:
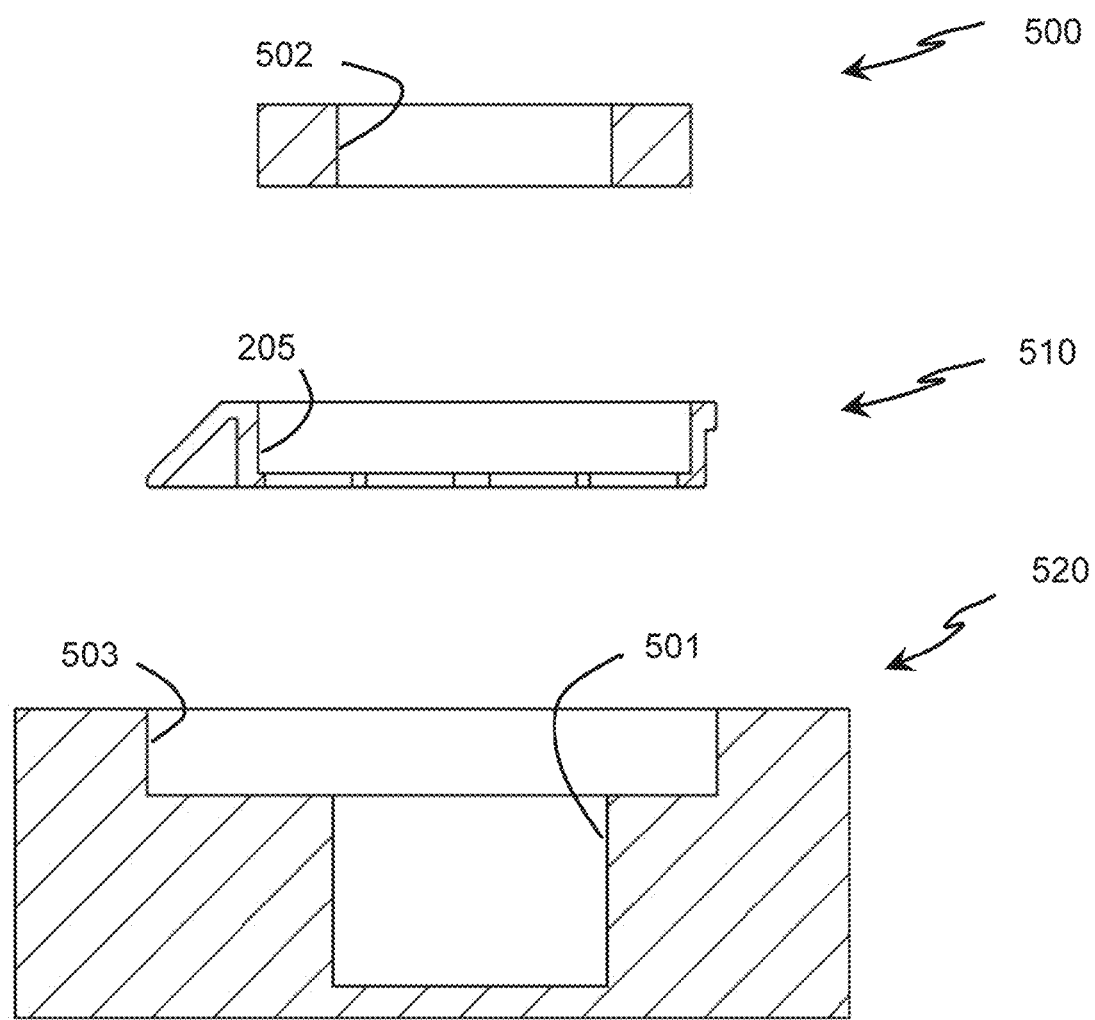
FIG. 23 is a cross-sectional view, taken along the line 23-23 of FIG. 21, of the casting mold system of FIG. 20.
Figure 24:
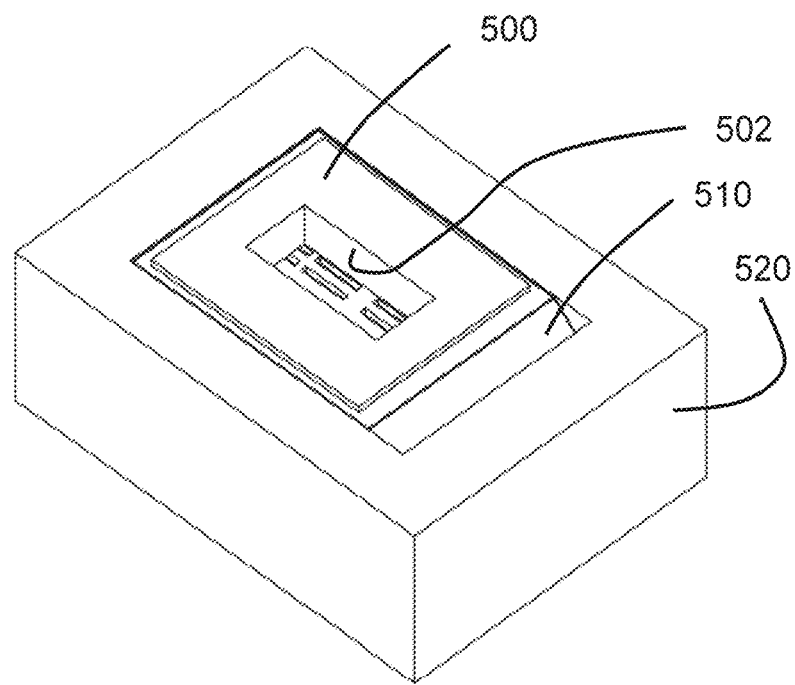
FIG. 24 is an assembled perspective view of the casting mold system of FIG. 20.
Figure 25:
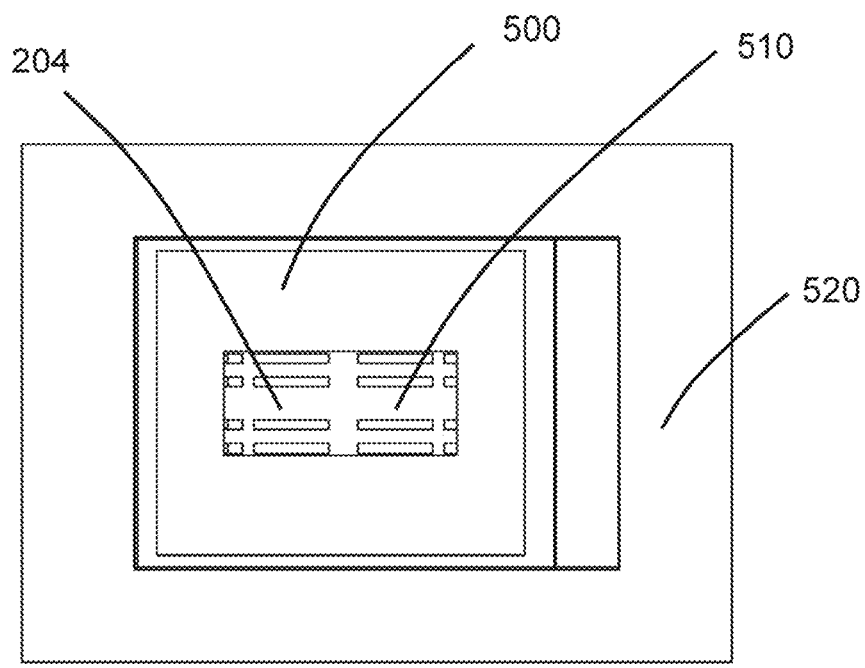
FIG. 25 is a top plan view of the assembled casting mold system of FIG. 24.
Figure 26:
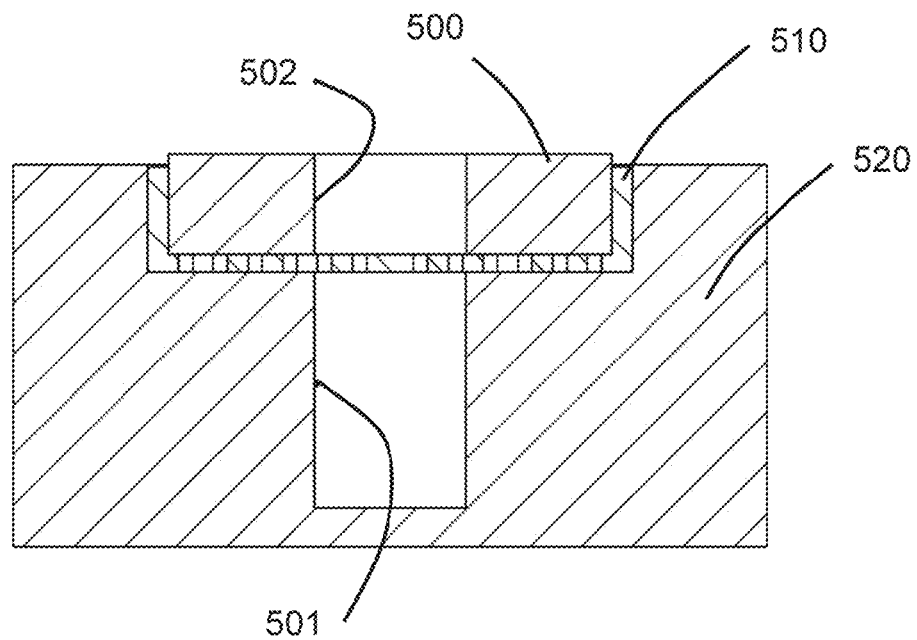
FIG. 26 is a cross-sectional view, taken along the line 26-26 of FIG. 27, of the assembled casting mold system of FIG. 24.
Figure 27:
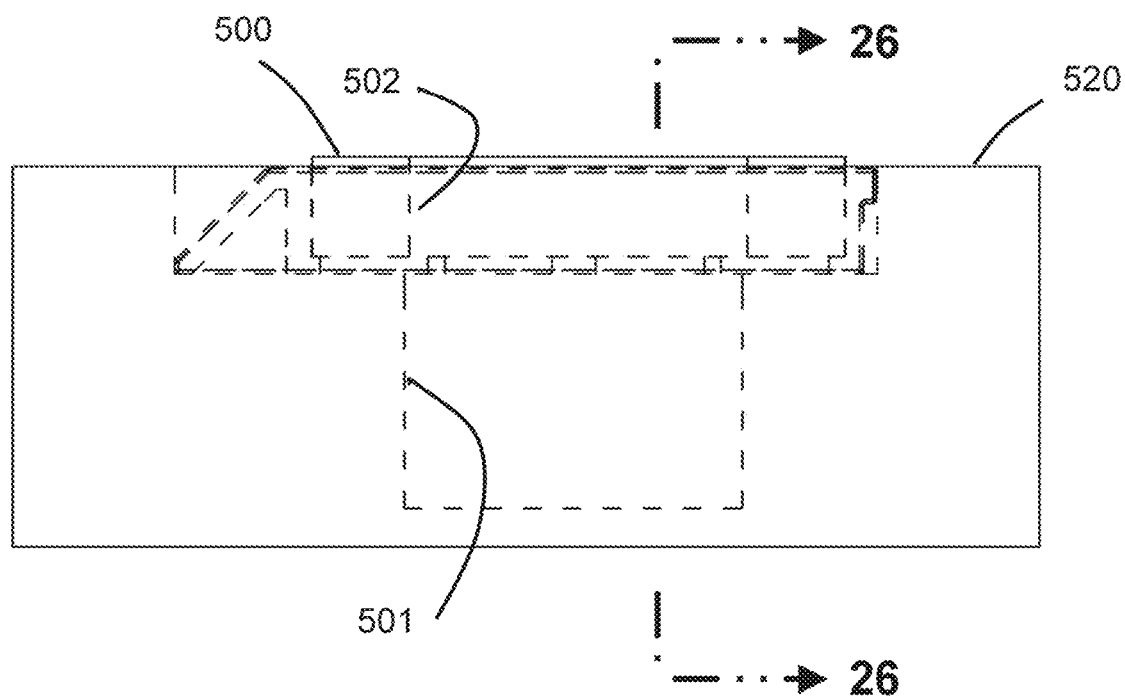
FIG. 27 is a side view, with hidden lines shown dashed, of the assembled casting mold system of FIG. 24.
Figure 28:
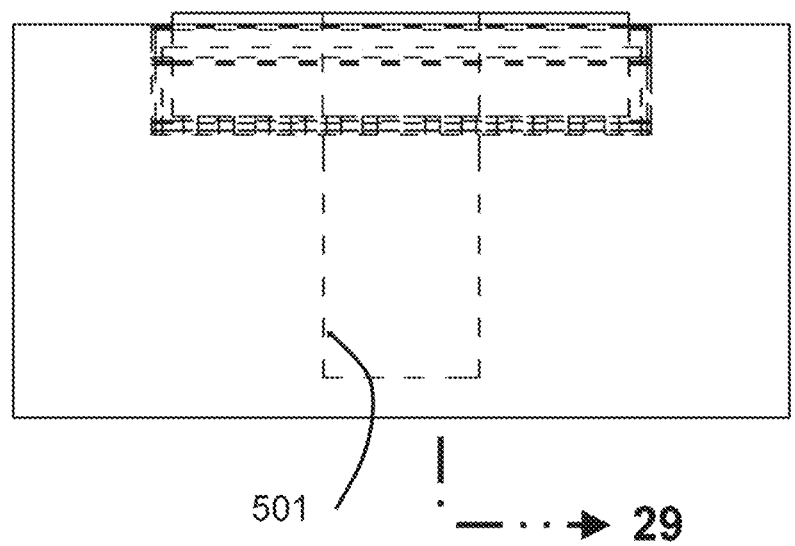
FIG. 28 is a rear view, with hidden lines shown dashed, of the assembled casting mold system of FIG. 24.
Figure 29:
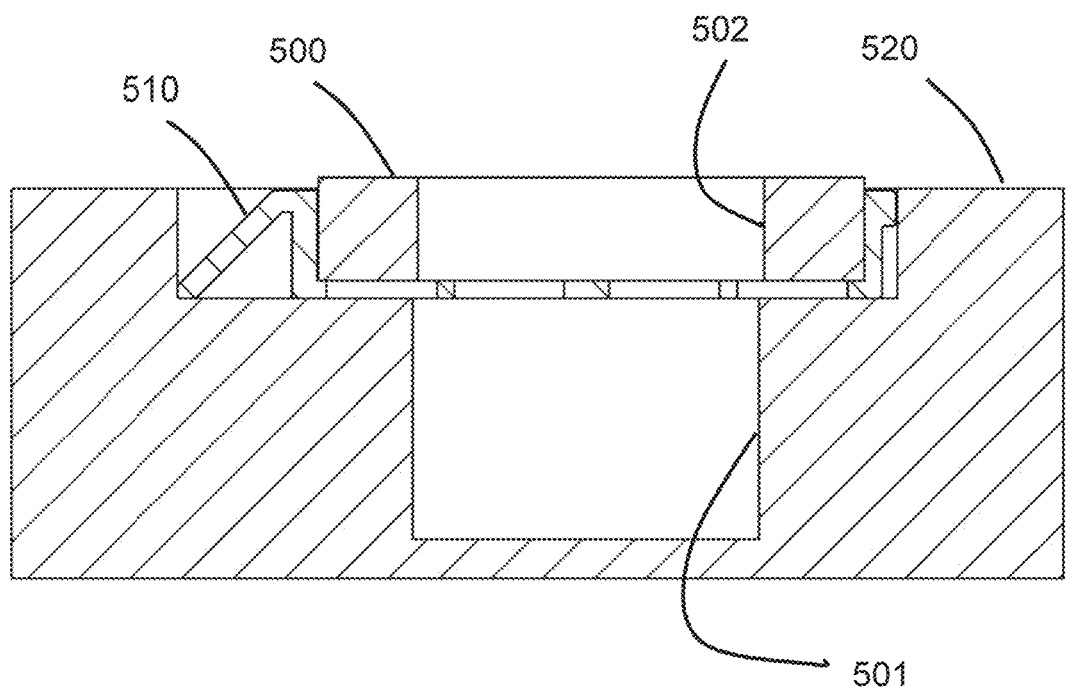
FIG. 29 is a cross-sectional view, taken along the line 29-29 of FIG. 28, of the assembled casting mold system of FIG. 24.
Figure 30:
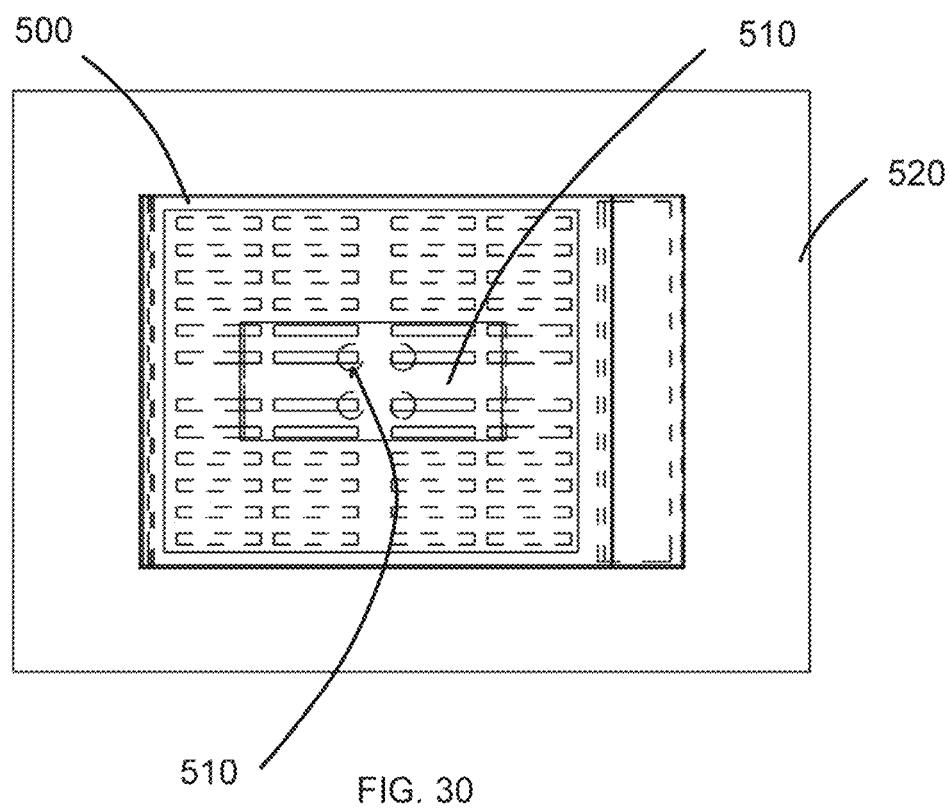
FIG. 30 is a top plan view of another embodiment of an assembled casting-mold system for creating a recipient block and histologic cassette assembly, for example similar to the microarray recipient block and histologic cassette assembly of FIG. 13.
Figure 31:
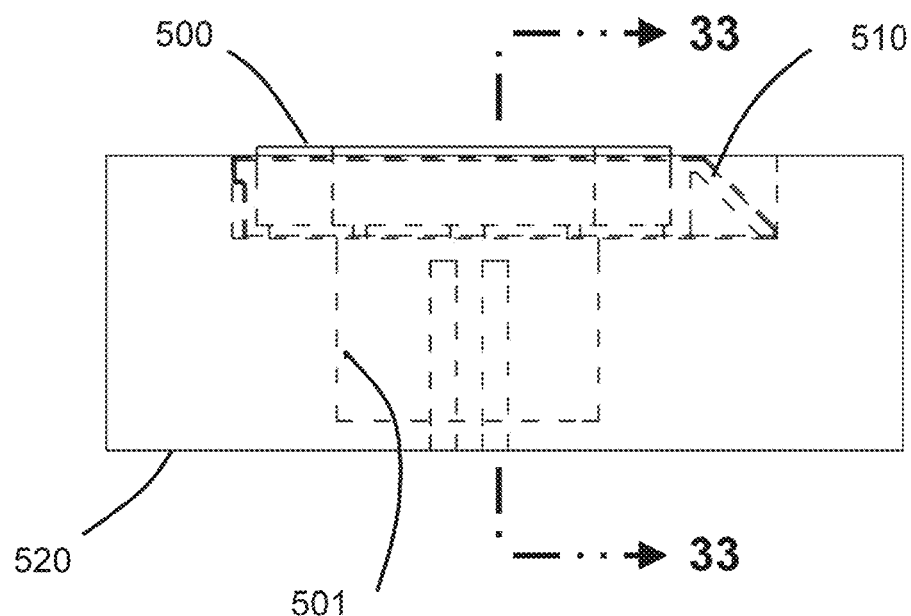
FIG. 31 is a side view, with hidden lines shown dashed, of the assembled casting mold system of FIG. 30.

The progression of steps 320 through 340 in FIG. 7 are depicted in one method of the invention utilizing container 14 and casting member 10 in FIGS. 9 and 10, respectively for the embodiments without and with a sealing element between the casting element and the container. The progression of steps 320 through 340 in FIG. 8 are depicted in one method of the invention utilizing container 20 and casting member 10 in FIGS. 11 and 12, respectively for the embodiments without and with a sealing element between the casting element and the container. FIGS. 11 and 12 depict an embodiment in which the plunger element can be advanced by means of a rod, for example rod 24, passing through an aperture, for example aperture 26, provided at the second end 32 of the container element 13. It is appreciated that other means may be used to apply force to advance the plunger element, for example plunger 22. For example, pressurized gas or liquid may be introduced through the aperture 22 shown so as to urge the plunger from a first or home position located nearby end 32 to a second or actuated position away from end 32, for example closer to end 31. In any embodiment, a ferromagnetic material, or a magnetized material, may be coupled by direct or indirect contact with the plunger element 22. In this case, for example, an urging force may be applied to the plunger element via the application of a magnetic field, with or without the necessity of an aperture 26. In any embodiment, a magnetic element providing such urging force can be disposed outside of chamber or reservoir 15, that is outside of container element 13.

FIGS. 13-19 depict an embodiment of a recipient block for use in constructing a microarray block. The recipient block 201 can be bonded to a histologic cassette of any suitable type, for example cassette 388. Any embodiment of a suitable histologic cassette 202 can be formed from a body 203 made from any suitable material, such as rigid plastic. Body 203 can include a planar support layer 204 having opposite first and second surfaces 206, 207, each of which can be planar. The body 203 can be provided with a cavity 205, having a base formed by second surface 207 of the planar support layer 204. The planar support layer can be provided with a plurality of openings 208 extending between the first and second surfaces 206, 207 for forming a plurality of support elements 209 in the planar support layer 204. In any embodiment, each of the openings 208 can be a slot, and in any embodiment each of the slots can extend parallel to each other. The recipient block 201 can be carried by the cassette 202 in any suitable manner, for example supported by planar support layer 204. In any embodiment, the recipient block 201 can rest on first surface 206 of the cassette 202. The recipient block 201 can be secured to the cassette, for example planar support layer 204 of the cassette 202, in any suitable manner. In any embodiment, a portion of the recipient block 201 can be embedded in at least a portion of the planar support layer 204 so as to be carried by and secured to the planar support layer 204 thereby.

Recipient block 201 can be formed from any suitable material, including any of the materials disclosed herein. In any embodiment, the recipient block can be formed from an agarose gel. In any embodiment, for example where a portion of the recipient block can be embedded in the planar support layer 204, the recipient block 201 can have a first portion 211 extending from the first surface 206 of the planar support layer 204 and a second portion 212 extending from the second surface 207 of the planar support layer 204. In any embodiment, the second portion 212 can be disposed in cavity 205 of the cassette body 203. The recipient block 201 can extend through at least some of the openings 208 in the planar support layer 204 so as to embed at least some of the support elements 209 of the support layer 204 between the first and second portions 211, 212 of the recipient block 201. The first portion 211 of the recipient block 201 can have a surface 216, for example a top or front surface, spaced from the first surface 206 of the planar support layer 204. In any embodiment, the surface 216 of the first portion 211 can be planar and parallel to the planar support layer 204. The first portion 211 of the recipient block can be provided with at least one bore or well 221 extending into the first portion from the surface 216 that is adapted to receive the biological sample material, for example a core of the biological sample material and medium. In any embodiment, the first portion 211 can include a plurality of parallel bores or wells 221 extending from surface 216 into the first portion. The plurality of bores 221 can be parallel to each other, and spaced in an array on surface 216 with rows and columns of bores 221. One or more of the bores 221 in the recipient block 201 can extend through the first portion 211 and through one of the openings 208 in the planar support layer 204 and through the second portion 212. One or more of the bores 221 can have a first section 222 in the first portion 211 with a transverse dimension and a second section 223 in the second portion 211 with a transverse dimension that can be smaller than the transverse dimension of the first section 222 of the bore 221. The first section 222 of the bore 221 can be referred to as a well and the second section 223 of the bore 221 can be referred to as a duct. The second portion 212 of the recipient block 201 can have a surface 226, for example a top or front surface, spaced from the second surface 207 of the planar support layer 204. In any embodiment, the surface 226 of the second portion 212 can be planar and parallel to the planar support layer 204.

FIGS. 20-33 depict an embodiment of a suitable casting system 499 for producing recipient microarray blocks, for example recipient block 201. Item 500 is an optional component and can be a frame to occupy part of the hollow cavity 205 at the back of histologic cassette 510, for example cassette 202. In any embodiment, item 500 can include a mold 502 to form the second portion 212 of the recipient block 201. Item 520 can include a mold with an internal cavity 501 of the overall shape desired for the recipient block 201, for example the shape of the first portion 211 of the recipient block 201. In any embodiment, item 520 can include a recess 503 for receiving cassette 510, which can include item 500 disposed in the cavity 205 of the cassette 510.

Figure 34:
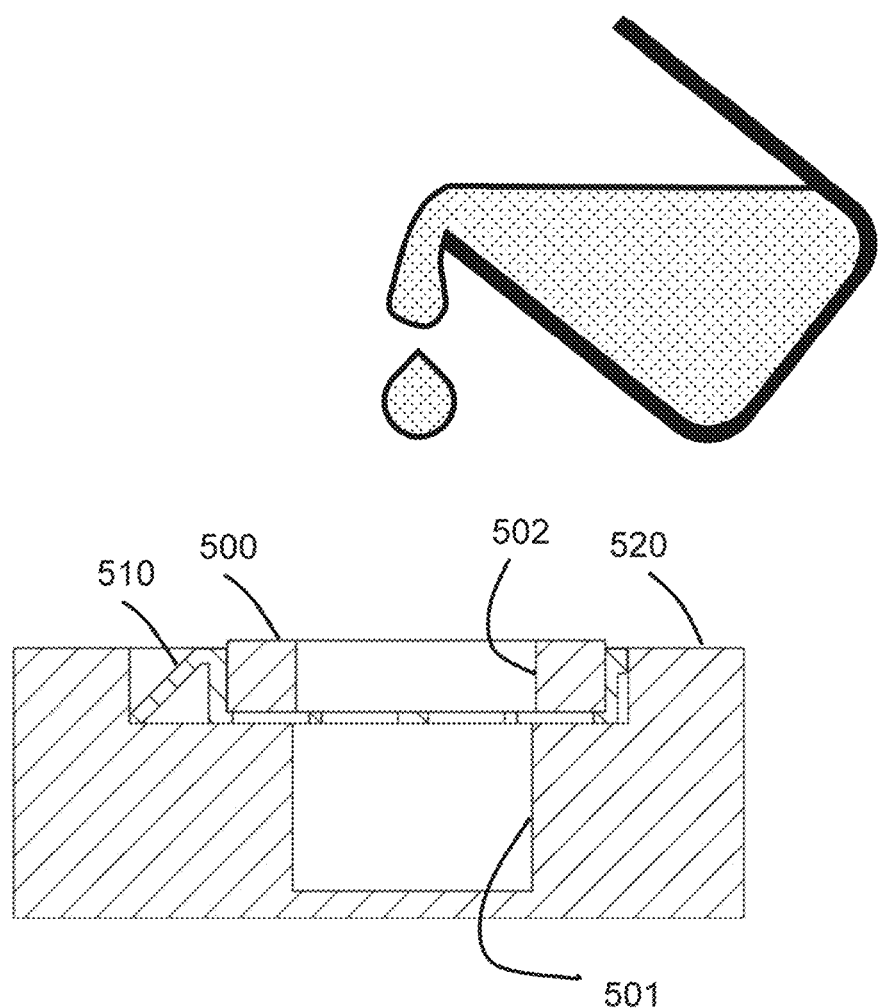
FIG. 34 is a schematic illustration of one step of one embodiment of a method of the present invention, with internal hidden lines shown as dashed, for creating a recipient block and histologic cassette assembly of the present invention, for example the recipient block and histologic cassette assembly of FIG. 13, by for example pouring a liquid into the casting mold system of FIG. 24 or FIG. 30.
Figure 35:
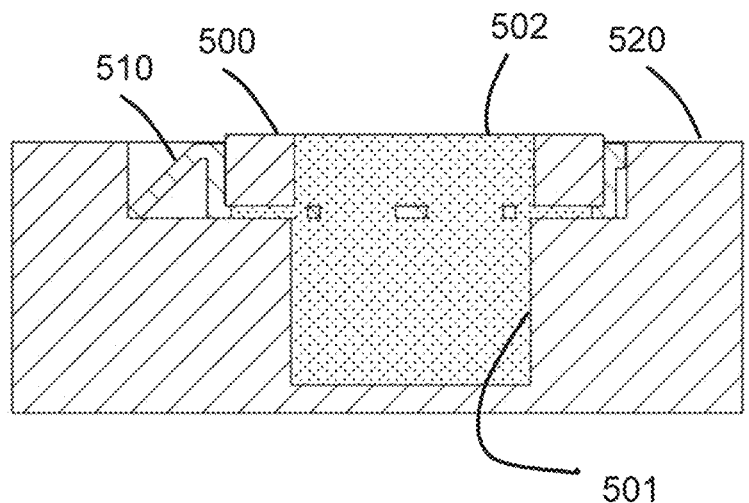
FIG. 35 is a schematic illustration of another step of one embodiment of a method of the present invention, with internal hidden lines shown as dashed, for creating a recipient block and histologic cassette assembly of the present invention, for example the recipient block and histologic cassette assembly of FIG. 13, wherein a liquid has been poured into the casting mold system of FIG. 24 or FIG. 30.

FIG. 34 illustrates the pouring of a liquid into such a casting system, for example casting system 499. As indicated in FIG. 35, the poured liquid can flow through the openings 208 in the histologic cassette 510 and fills the volume on both sides of the cassette not occupied by items 500 nor 520, for example cavity 501 in item 520 and cavity 502 in item 500. The liquid material subsequently solidifies in any suitable manner, for example due to cooling or another mechanism such as a polymerization reaction. The solid block material in FIG. 35, for example the solidified material, can then be removed from the casting system, resulting in a recipient block 201 such as shown in FIGS. 13-19 but possibly without bores yet formed in the block. The recipient block 201 can be attached to the cassette 510 by interlocking through the openings 208 in the cassette and around support elements 209 of the planar support layer 204 of the cassette.

Figure 32:
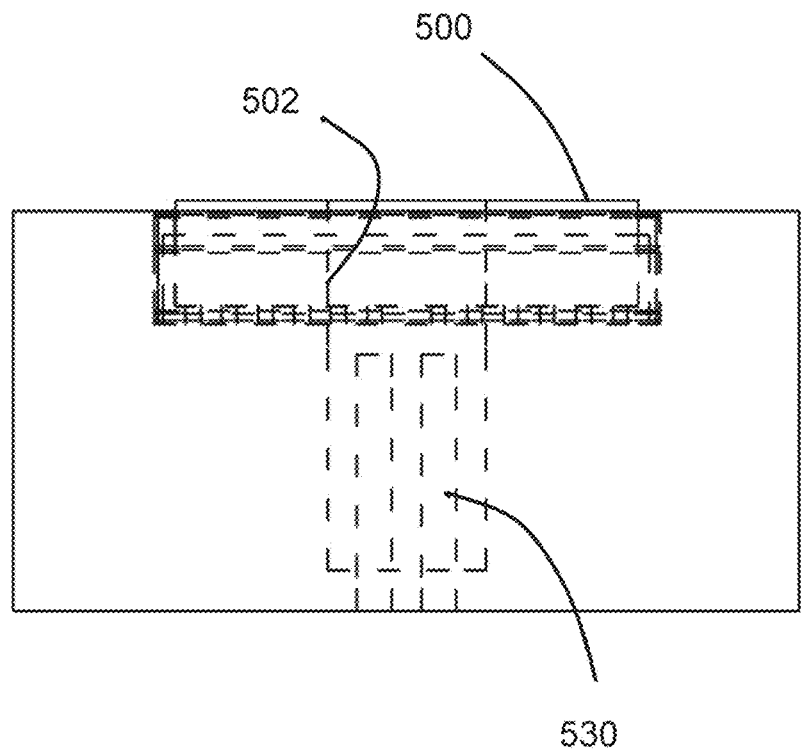
FIG. 32 is front view, with hidden lines shown dashed, of the assembled casting mold system of FIG. 30.
Figure 33:
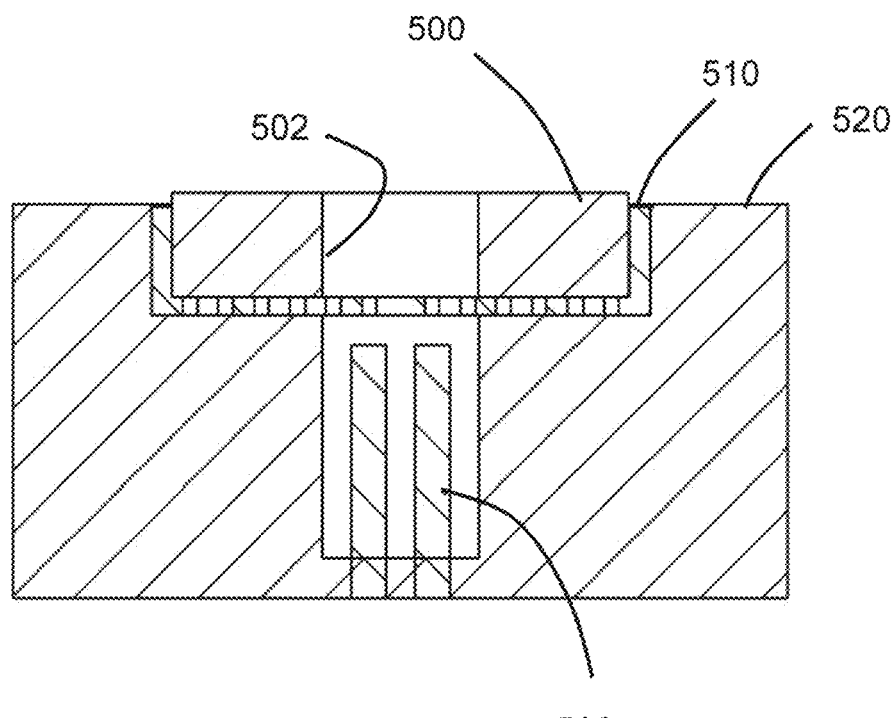
FIG. 33 is a cross-sectional view, taken along the line 33-33 of FIG. 31, of the assembled casting mold system of FIG. 30.

One or more bores 221 of the recipient block 201, for example shown in FIGS. 13-19, can be formed in any embodiment by a material removal process such as drilling, punching, coring, or milling of the recipient block 201. Alternatively, the one or more bores 221 can be formed in the casting process, for example by using pins 530 as shown in FIGS. 32-33. Pins 530 may have additional protrusions (not shown in FIGS. 32-33) of smaller dimension that extend through openings 208 in the cassette 510 in order to produce through-ducts in a portion of the recipient block 201, for example ducts 223 in the second portion 212 of the recipient block 201. Such ducts 223 can facilitate placement of the cores of biological material and medium within first section 222 of the one or more bores 221 of the recipient block 201.

The wells in the recipient block, for example wells 222, and correspondingly the cores of the microarray, may be of any suitable size. For example, such wells and cores may be cylindrical shapes having a diameter ranging from 0.5 to 5 millimeters and a length ranging from one to twenty millimeters.

In any embodiment, the material of the recipient block can be an agarose gel material, composed for example of 2% by volume agarose. During the casting process, for example the process depicted in FIGS. 34-35, the liquid material may be the aqueous form of this agarose gel material, in which the remaining volume can be largely composed of water. In this embodiment, after removal from the casting system 499 the block 201 with attached cassette 510 or 202 may be dehydrated and paraffin infiltrated, for the purpose of making it wettable by, and bondable with, paraffin-containing microarray cores.

In any embodiment of constructing a microarray block using recipient block 201, step 380 from FIGS. 7-8 can be performed. In this step, cores 382 can be placed in the wells 222 of the recipient block 201. A further step may be performed to enhance the bonding of the cores to the recipient block. This step may comprise heating the combination of recipient block and cores to a temperature at which some fusing of these materials occurs, for example by softening or partial melting of paraffin contained within one or more of these materials. In any embodiment, the bonding step may include the addition of further liquid paraffin or other material. In any embodiment, the entire recipient block 201 may be embedded in such a material by casting the liquid form of the material into another mold of volume larger equal to or larger than the recipient block 201, then allowing the combination of all materials to become solid by cooling or another solidification mechanism such as a polymerization reaction.

In any embodiment, the recipient block 201 can be composed of a material which remains solid or semi-solid when subjected to a temperature at which another substance, capable of bonding the cores to the recipient block, exists in the liquid state. This property of such material of the recipient block 201 enables the liquid form of such other substance to be added to the assembly of recipient block and cores while the relative positions of the recipient block, cores, and histologic cassette are maintained. In any embodiment, the material of the recipient block 201 may be agarose gel that has been dehydrated and paraffin infiltrated, and the material used for bonding the cores to the recipient block may be paraffin. In such embodiment, the agarose gel remains solid at the temperature at which paraffin is liquid.

As used herein, a cylinder is intended to mean a surface traced by a straight line moving parallel to a fixed straight line and intersecting a fixed planar closed curve, a solid or surface bounded by a cylinder and two parallel planes cutting all its elements, or any combination of the foregoing.

In one aspect of the invention, a method for making a microarray block can be provided and can include providing a recipient block with at least one bore therein, the at least one bore having a cross sectional shape, providing a mold having a cylindrical bore with a cross sectional shape approximating the cross sectional shape of the at least one bore of the recipient block, the mold having opposite first and second ends, the first end of the mold having an opening that communicates with the cylindrical bore of the mold, introducing a biological sample and a liquid carrier medium through the opening, solidifying the biological sample and the liquid carrier medium in the mold to form a core, removing the core from the mold and inserting at least a portion of the core into the at least one bore of the recipient block.

The biological sample can be selected from the group consisting of a tissue sample, cell cultures, disaggregated tissue, derivative biological materials and a combination of the foregoing. The liquid carrier medium can be selected from the group consisting of paraffin wax, agarose gel and a polymeric medium. The method can further include the step of mixing the biological sample and the liquid carrier medium within the cylindrical bore of the mold. The method can further include the step of mixing the biological sample and the liquid carrier medium before the introducing step. The solidifying step can include heating the biological sample and the liquid carrier medium in the mold. The at least one bore in the recipient block can have a length and the core can have a length independent of the length of the at least one bore. The core can have a length longer than the length of the at least one bore. The recipient block can be formed from a material, further comprising the step of making the core compatible with the material of the recipient block. The recipient block can be formed from paraffin and the making the core compatible step can include dehydrating the core and infiltrating the core with paraffin.

In one aspect of the invention, a method for making a microarray block can be provided and can include providing a mold having a cylindrical bore, the mold having opposite first and second ends, the first end of the mold having an opening that communicates with the cylindrical bore, introducing a biological sample and a liquid carrier medium through the opening in the mold, solidifying the biological sample and the liquid carrier medium in the mold to form a core, removing the core from the mold and disposing the core in a recipient block.

The disposing step can include forming a recipient block around at least a portion of the length of the core. The disposing step can include providing a recipient block with at least one bore therein and inserting at least a portion of the core into the at least one bore of the recipient block.

In one aspect of the invention, a method for making a microarray block can be provided and can include providing a recipient block formed of a material and having at least one bore therein, the at least one bore having a cross sectional shape, providing a core of a biological sample and a carrier medium having a cross sectional shape approximating the cross sectional shape of the at least one bore of the recipient block, making the core compatible with the material of the recipient block and inserting at least a portion of the core into the at least one bore of the recipient block.

The recipient block can be formed from paraffin and the making the core compatible step can include dehydrating the core and infiltrating the core with paraffin. The at least one bore in the recipient block can have a length and the core can have a length independent of the length of the at least one bore. The core can have a length longer than the length of the at least one bore.

In one aspect of the invention, a method for making a microarray block can be provided and can include providing a cylindrical core of a biological sample and a carrier medium, disposing the core in a recipient block formed from a material and making the core compatible with the material of the recipient block before the disposing step.

The disposing step can include forming a recipient block around at least a portion of the length of the cylindrical core. The disposing step can include providing a recipient block with at least one bore therein, the cylindrical core having a cross sectional shape approximating the cross-sectional shape of the at least one bore of the recipient block, and inserting at least a portion of the core into the at least one bore of the recipient block.

In one aspect of the invention, an assembly for forming a core of a biological sample for use in a recipient block having at least one bore with a cross sectional shape can be provided and can include a container having a reservoir adapted to receive the biological sample and a liquid carrier medium, the container being provided with an opening that communicates with the reservoir, a mold having an end and being provided with a cylindrical bore with a cross sectional shape approximating the cross sectional shape of the at least one bore of the recipient block and opening at the end of the mold, wherein the end of the mold can sealably engage the opening in the container for permitting the biological sample and the liquid carrier medium to be transferred from the reservoir to the cylindrical bore for forming the core.

The opening in the container can have a cross sectional shape and the mold can have an end provided with an outer surface having a cross sectional shape that approximates the cross-sectional shape of the opening in the container. The mold can be configured to slidably and sealably extend into the opening in the container so as to urge the biological sample and the liquid carrier medium from the reservoir into the cylindrical bore of the mold. The outer surface of the mold can have a length and the reservoir can have a depth at least equal to the length of the outer surface for permitting the end of the mold to slidably and sealably extend into the opening in the container for urging the biological sample and the liquid carrier medium from the reservoir into the cylindrical bore of the mold. The assembly can further include a seal provided at the least one of the outer surface of the mold and the opening in the container. The reservoir of the container can be a cylindrical bore having a cross sectional shape that approximates the cross-sectional shape of the opening in the container. The assembly can further include a plunger slidably disposed in the reservoir for urging the biological sample and the liquid carrier medium from the reservoir into the cylindrical bore of the mold. The assembly can further include a pressurized fluid source coupled to the container for moving the plunger from a first position to a second position for urging the biological sample and the liquid carrier medium from the reservoir into the cylindrical bore of the mold. The assembly can further include an actuation element coupled to the plunger for moving the plunger from a first position to a second position so as to urge the biological sample and the liquid carrier medium from the reservoir into the cylindrical bore of the mold.

In one aspect of the invention, an assembly for use with biological sample material to make a microarray block can be provided and can include a cassette having a planar support layer with opposite first and second surfaces, the planar support layer being provided with a plurality of openings extending between the first and second surfaces and forming a plurality of support elements in the planar support layer, a recipient block formed from an agarose gel, the recipient block having a first portion extending from the first surface of the planar support layer and a second portion extending from the second surface of the planar support layer, the recipient block extending through at least some of the plurality of openings in the planar support layer so as to embed at least some of the plurality of support elements between the first and second portions of the recipient block, the first portion of the recipient block having a surface spaced from the first surface of the planar support layer and being provided with at least one bore extending from the surface into the first portion that is adapted to receive the biological sample material.

The at least one bore can include a plurality of parallel bores extending into the first portion. The at least one bore can extend into the first portion extends through one of the plurality of openings in the planar support layer and through the second portion. The at least one bore can have a first section in the first portion with a transverse dimension and a second section in the second portion with a transverse dimension that is smaller than the transverse dimension of the first section. The surface of the first portion can be planar and parallel to the planar support layer and the second portion can have a surface that is planar and parallel to the planar support layer. The agarose gel of the recipient block can be dehydrated and infiltrated with paraffin.

In one aspect of the invention, a method for forming an assembly for use with biological sample material to make a microarray block can be provided and can include providing a cassette having a planar support layer with opposite first and second surfaces, the planar support layer being provided with a plurality of openings forming a plurality of support elements in the planar support layer and forming a recipient block from an agarose gel having a first portion extending from the first surface of the planar support layer and a second portion extending from the second surface of the planar support layer, the recipient block extending through at least some of the plurality of openings in the planar support layer so as to embed at least some of the plurality of support elements between the first and second portions of the recipient block.

The method can further include the step of forming at least one bore extending into the first portion that is adapted to receive the biological sample material. The forming step can include providing a first mold in front of the first surface of the planar support layer and providing a second mold in front of the second surface of the planar support layer and introducing agarose gel into the first and second molds to respectively form the first and second portions of the recipient block.

The apparatus and methods of the present invention can offer significant advantages over the prior art, which are highly relevant to the quality and quantity of final product achievable from a fixed amount of sample material, which in certain instances can be a precious resource. For example, the apparatus and methods of the invention can increase the utilization, and thereby reduce the waste, of sample material by reducing the fraction of sample material that is not formed into the desired shape for the cores of a microarray, enabling extremely large aspect ratio, that is ratio of length to diameter, in resulting cores or a combination of the foregoing. In this regard, for example, typical values of diameter in tissue/cell microarrays are from 0.5 millimeter to 5.0 millimeter, while the apparatus and method of the invention enables this range and beyond, for example 0.1 millimeter to 25 millimeters, and with aspect ratios up to the order of 100. The apparatus and method of invention enable microarray block core lengths to be much longer than conventionally done, and more uniform in length than conventionally done. In this regard, for example, typical depths of cores, for example as shown in FIG. 1, are at most three to five millimeters, while the apparatus and method of the invention permit microarray blocks with core depths of 20 to 50 millimeters, thus enabling greater efficiencies upon histologic sectioning.

The apparatus and methods of the invention can facilitate techniques for maximizing the uniformity of the resulting cores. In this regard, a variety of mixing and/or concentrating techniques, for example vortex mixing and centrifugation, are enabled. In addition, minimization of air bubbles introduced to the sample is enabled by the ability of the apparatus and method of the invention to include the application of vacuum and/or heat for dissolution of gases, centrifugation for bubbles removal due to buoyancy, inversion of the casting element and container element assembly, for example as shown in FIGS. 9-12, just prior to completion of the stroke, for example as shown in FIG. 9D, 10D, 11D, or 12D, in order to sequester air bubbles from entering the lumen of the casting element, or any combination of the foregoing.

The apparatus and methods of the invention can facilitate maintaining sterility and purity of the core since the components, for example the casting element and container element for example as shown in FIGS. 9-12, can be simple, disposable components.

We claim:

1. A method for making a microarray block, comprising:
   providing a mold having a cylindrical bore, the mold having opposite first and second ends, the first end of the mold having an opening of the cylindrical bore,
   introducing a biological sample and a liquid carrier medium of the aqueous form of an agarose gel through the opening in the mold, the biological sample being selected from the group consisting of a tissue sample, cell cultures and a combination of the foregoing,
   solidifying the liquid carrier medium in the mold to form a cylindrical core formed of both the biological sample and the agarose gel and having a length, the biological material being distributed along the length of the cylindrical core,
   removing the cylindrical core from the mold,
   disposing at least a portion of the cylindrical core in an internal bore in a recipient block formed from a material selected from the group consisting of paraffin wax, an agarose gel and a combination of the foregoing, and
   dehydrating the cylindrical core and infiltrating the cylindrical core with paraffin before the disposing step to make the cylindrical core capable of forming a bond with the recipient block of sufficient strength to enable sections with physical integrity to be cut from the recipient block for analysis.

2. The method of claim 1, wherein the recipient block is formed from paraffin.

3. The method of claim 1, wherein the internal bore has a length and the cylindrical core has a length that is greater than the length of the internal bore.

4. A method for making a microarray block, comprising:
   providing a cylindrical core formed of both a biological sample and an agarose gel and having a length, the biological sample being selected from the group consisting of a tissue sample, cell cultures and any combination of the foregoing and being distributed along the length of the cylindrical core,
   dehydrating the cylindrical core and infiltrating the cylindrical core with paraffin to form a processed cylindrical core capable of forming a bond with a recipient block of sufficient strength to enable sections with physical integrity to be cut from the recipient block for analysis, and
   disposing at least a portion of the processed cylindrical core in an internal bore in the recipient block formed from a material selected from the group consisting of paraffin wax, an agarose gel and a combination of the foregoing.

5. The method of claim 4, wherein the internal bore of the recipient block has a cross-sectional shape, the cylindrical core having a cross-sectional shape equal to the cross-sectional shape of the internal bore.

6. The method of claim 4, wherein the internal bore in the recipient block has a length and the cylindrical core has a length that is greater than the length of the internal bore.

7. The method of claim 4 wherein the recipient block has a plurality of internal bores and wherein the disposing step includes disposing at least a portion of the processed cylindrical core into the plurality of internal bores.

8. The method of claim 7, further comprising slicing the recipient block into a plurality of sections each containing a plurality of sections of the processed cylindrical core.

9. The method of claim 4, wherein the processed cylindrical core is one of a plurality of processed cylindrical cores formed via the method of claim 4, wherein the recipient block has a plurality of internal bores and wherein the disposing step includes disposing at least a portion of one of the plurality of processed cylindrical cores into each of the plurality of internal bores.

10. The method of claim 4, wherein the cylindrical core has a diameter ranging from 0.1 millimeter to 25 millimeters.

11. The method of claim 4, wherein the cylindrical core has a length and a transverse dimension and a ratio of length to transverse dimension of up to the order of 100.

12. The method of claim 4, wherein the internal bore of the recipient block has a cross sectional shape, further comprising the steps of:
    providing a mold having a cylindrical bore with a cross sectional shape equal to the cross sectional shape of the internal bore, the mold having opposite first and second ends, the first end of the mold having an opening of the cylindrical bore of the mold,
    introducing the biological sample and a liquid carrier medium of the aqueous form of the agarose gel through the opening,
    solidifying the liquid carrier medium of the aqueous form of the agarose gel in the mold to form the cylindrical core of both the biological sample and the agarose gel, and
    removing the cylindrical core from the mold.

13. The method of claim 12, further comprising the step of mixing the biological sample and the liquid carrier medium of the aqueous form of the agarose gel within the cylindrical bore of the mold.

14. The method of claim 12, further comprising the step of mixing the biological sample and the liquid carrier medium of the aqueous form of the agarose gel before the introducing step.

15. The method of claim 12, wherein the solidifying step comprises heating the biological sample and the liquid carrier medium of the aqueous form of the agarose gel in the mold.

16. The method of claim 12, wherein the internal bore in the recipient block has a length and the cylindrical core has a length that is greater than the length of the internal bore.

17. The method of claim 4, further comprising the steps of:
    providing a mold having a cylindrical bore, the mold having opposite first and second ends, the first end of the mold having an opening of the cylindrical bore,
    introducing the biological sample and a liquid carrier medium of the aqueous form of the agarose gel through the opening in the mold,
    solidifying the biological sample and the liquid carrier medium of the aqueous form of the agarose gel in the mold to form the cylindrical core of both the biological sample and the agarose gel, and
    removing the cylindrical core from the mold.

* * * * *